US009366691B2

(12) United States Patent
Choi et al.

(10) Patent No.: US 9,366,691 B2
(45) Date of Patent: Jun. 14, 2016

(54) MULTIPLEXED FIBER OPTIC SENSING SYSTEM AND METHOD

(71) Applicant: Halliburton Energy Services, Inc., Houston, TX (US)

(72) Inventors: Han-Sun Choi, Houston, TX (US); Etienne Samson, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 13/875,707

(22) Filed: May 2, 2013

(65) Prior Publication Data
US 2014/0326860 A1 Nov. 6, 2014

(51) Int. Cl.
*G01J 1/04* (2006.01)
*G01P 15/093* (2006.01)
(Continued)

(52) U.S. Cl.
CPC .......... *G01P 15/093* (2013.01); *G01D 5/35306* (2013.01); *G01D 5/35335* (2013.01); *G01D 5/35387* (2013.01); *G01H 9/004* (2013.01); *G01P 15/18* (2013.01)

(58) Field of Classification Search
CPC ............ G01J 1/0425; G01J 3/26; G01J 3/02; G01J 9/0246; G01J 3/28; G01J 9/02; G01J 1/04; G01P 3/36; G01P 3/68; G01P 3/806; G02B 26/001; G01M 11/331; G01N 21/45; G01N 21/1717; G01D 5/35303; G01D 5/35383; G01D 5/353; G01D 5/266; G01D 5/268; G01D 5/35387; G01D 5/3539; G01B 11/02; G01B 11/16; G01B 11/161; G01B 9/02; G01B 11/002; G01B 11/22; G01B 9/02097; G01H 9/004; G01H 9/00

USPC ............ 250/227.11, 227.14, 227.18, 227.19; 356/27–28.5, 32, 35.5, 454, 477, 478, 356/482, 484, 486, 496, 498, 506; 340/500, 340/540, 541, 545.3, 552, 555–557, 561, 340/600, 665, 669, 670; 385/12, 13
See application file for complete search history.

(56) References Cited

U.S. PATENT DOCUMENTS 5,313,266 A     5/1994  Keolian et al.
5,355,243 A *  10/1994  King ............................. 398/203
(Continued)

FOREIGN PATENT DOCUMENTS

EP          1110065 B1      3/2008
JP       2000-283843 A     10/2000
WO    WO-2014/179073 A1    11/2014

OTHER PUBLICATIONS

"High Performance, Reliable All-Optical Geophone for Permanent Oilfield Monitoring", USSI Geophone Online Brochure, US Seismic Systems, Inc., (2011), 2 ps.

(Continued)

*Primary Examiner* — Seung C Sohn
(74) *Attorney, Agent, or Firm* — Schwegman, Lundberg & Woessner, P.A.; John W. Wustenberg

(57) ABSTRACT

A sensing system includes plurality of sensors along the lengths of input and output optical fibers. Each sensor receives broadband pulses from the input fiber, dynamically senses a plurality of physical parameters in a one-to-one correspondence with a plurality of predefined wavelength bands, and forms signal pulses from the broadband pulses by transmitting only a single wavelength within each wavelength band. Each single wavelength has a dynamically-varying peak wavelength value indicative of the corresponding sensed physical parameter. The signal pulses from the output optical fiber are directed into one or more interferometers, which produce a phase deviation corresponding to each dynamically-varying peak wavelength value.

17 Claims, 14 Drawing Sheets

(51) Int. Cl.
*G01H 9/00* (2006.01)
*G01P 15/18* (2013.01)
*G01D 5/353* (2006.01)

(56) References Cited

U.S. PATENT DOCUMENTS

| | | | |
|---|---|---|---|
| 5,680,489 A * | 10/1997 | Kersey | 385/12 |
| 5,903,350 A | 5/1999 | Bush | |
| 6,282,334 B1 | 8/2001 | Hodgson et al. | |
| 6,556,509 B1 | 4/2003 | Cekorich et al. | |
| 6,778,720 B1 | 8/2004 | Cekorich | |
| 6,789,424 B2 | 9/2004 | Knudsen et al. | |
| 7,428,054 B2 | 9/2008 | Yu et al. | |
| 7,622,706 B2 | 11/2009 | Maas | |
| 2006/0204164 A1 | 9/2006 | Ivtsenkov | |
| 2007/0258319 A1 * | 11/2007 | Ronnekleiv et al. | 367/20 |
| 2008/0220397 A1 * | 9/2008 | Capone | F41J 9/14 434/20 |
| 2008/0304830 A1 * | 12/2008 | Huang | H04J 14/0226 398/79 |
| 2010/0046002 A1 * | 2/2010 | Perez et al. | 356/478 |
| 2011/0032605 A1 | 2/2011 | Kliner et al. | |
| 2014/0211202 A1 * | 7/2014 | Niewczas et al. | 356/73.1 |

OTHER PUBLICATIONS

"International Application Serial No. PCT/US2014/034327, International Search Report mailed Aug. 12, 2014", 3 pgs.

"International Application Serial No. PCT/US2014/034327, Written Opinion mailed Aug. 12, 2014", 10 pgs.

"TDI-7000 TDM Fiber Interrogator", Data Sheet, Rev. D. © 2009-2011 Optiphase, Inc. [online]. Retrieved from the Internet: <URL: http://www.optiphase.com/data_sheets/TD1-7000%20Data%20Sheet%20Rev%20D.pdf>, (2011), 2 pgs.

Brown, David A., et al., "A Symmetric 3x3 Coupler Based Demodulator for Fiber Optic Interfermetric Sensors", *SPIE vol. 1584, Fiber Optic and Laser Sensors IX*, (1991), 328-335.

Bush, Jeff, et al., "Low-Cost Interferometric TDM Technology for Dynamic Sensing Applications", *Proceedings, SPIE vol. 5589—Fiber Optic Sensor Technology and Applications III*, (2004), 132-143.

Davis, M. A., et al., "Characterization of 3 x 3 Fiber Couplers for Passive Homodyne Systems: Polarization and Temperature Sensitivity", *Proceedings, Optical Fiber Communication Conference, Technical Digest Series, vol. 5* (Houston. TX), (1989), p. 103.

Knudsen, Sverre, et al., "High Resolution Fiber-Optic 3-C Seismic Sensor System for in-Well Imaging and Monitoring Applications", *Optical Fiber Sensors*, (Cancun, Mexico, Oct. 23, 2006, (2006), 4 pgs.

Koo, K. P., et al., "Passive Stabilization Scheme for Fiber Interferometers Using 3x3 Fiber Directional Couplers", *Appl. Phys. Lett., vol. 41, No. 7*, (,Oct. 1982), 616-618.

Zhao, Z., et al., "Improved Demodulation Scheme for Fiber Optic Interferometers Using as Asymmetric Coupler", *Journal of Lightwave Technology, vol. 15, No. 11*, (Nov. 1997), 2059-.

"International Application Serial No. PCT/US2014/034327, International Preliminary Report on Patentability mailed Nov. 12, 2015", 12 pgs.

\* cited by examiner

MULTIPLEXED FIBER OPTIC SENSING SYSTEM AND METHOD

BACKGROUND

The present invention relates generally to methods and apparatus for distributed optical sensing of acoustic or mechanical energy, and more particularly relates to systems and methods using a sensing system including a plurality of sensors coupled to one or more optical fibers, and also to a broadband pulsed light source suitable for use in such a system.

Systems that sense acoustic or mechanical energy are used in a variety of applications, including, but not limited to, oilfield drilling and maintenance, underwater monitoring, and maintenance of large structures, such as mines, bridges and elevators. In these sensing systems, sensors take measurements at their respective locations. The measurements taken by the sensors are compiled and may be used to provide information regarding the structure(s) or locations that are monitored.

One class of sensor is optical in nature. An optical sensor can generate optical signals, and can direct the measured information to the processor via one or more optical fibers. One issue facing some optical fiber-based sensing systems is channel count. In one approach, respective sensors can be optically coupled to optical excitation or detection apparatus, such as using a one-to-one arrangement including a respective optical fiber for each sensor. However, such an approach may preclude use of more than a handful of optical sensing channels, because the number of optical fibers or channels may be limited due to cost or space constraints. For example, in a downhole application, a cross-sectional area available for optical fiber assemblies may be limited, and interconnect complexity between respective fibers and other portions of the sensing system may preclude large channel counts without compromising reliability.

For optical fiber-based sensing systems, it would be desirable to have a system that has a relatively high channel count while providing immunity to harsh environmental conditions, such as for use in geophysical, petrophysical, and structural applications, such as oil exploration and recovery. Furthermore, it would be desirable to have a broadband, pulsed, high-powered light source that may be used with such a system.

SUMMARY OF THE DISCLOSURE

The described example methods and apparatus utilize an array of interferometric sensors for distributed optical sensing of acceleration, acoustic energy, or mechanical vibration; with each sensor preferably operating within a defined frequency band within a broad band system. For example, in a geophysical application, such an array of sensors may be located in a fluid medium, such as in a borehole or underwater. Respective sensors in the array may be coupled to an optical source using an optical fiber.

In one example, the optical sensors include Fabry-Perot interferometer structures operated in a transmission mode. In such sensors, an acceleration, or acoustic or mechanical vibrational energy, can be coupled to a respective interferometer structure to adjust (e.g., modulate) a transmission characteristic of the interferometer structure, such as adjusting one or more of a transmitted wavelength of optical energy, or a phase of the transmitted optical energy. Such adjusted optical energy transmitted through respective interferometer structures can be coupled to an optical demodulator, and information indicative of the acceleration, or acoustic or mechanical vibration can be obtained. Wavelength division multiplexing (WDM) may be provided by specifying respective geometries of respective interferometer structures to provide staggered transmission wavelengths corresponding to respective sensors.

An available dynamic range of acoustic or mechanical sensing for a particular interferometric sensor may be established by an available range of mechanical displacement of one or more portions of the sensor. Such mechanical displacement establishes the range of wavelength deviation or phase deviation provided to an optical signal transmitted through the sensor. Generally, an optical source bandwidth (e.g., an available range of wavelengths) from the source is selected to provide a range of wavelengths about the same as or wider than a range of wavelength deviation provided by a respective interferometric sensor.

Time division multiplexing (TDM) may be provided by controlling delivery of respective instances of optical energy (e.g., optical pulses) to respective interferometer structures. For example, one or more of an optical switch or an optical delay line can be used, such as to delay, inhibit, or provide delivery of optical energy to respective sensors in a specified temporal order. And further in some examples, signals from such sensors will be communicated and processed through use of both TDM and WDM.

In some examples, a broadband source is used to provide pulses of broadband light for communication to an array of such sensors; and in some examples this broadband source includes a plurality of emitters that are pulsed simultaneously, with the emitted light combined to form a light pulse of relatively increased bandwidth relative to that of each emitter.

BRIEF DESCRIPTION OF THE FIGURES

The drawings show various embodiments demonstrating examples of apparatus and methods in accordance with the present invention.

DETAILED DESCRIPTION OF PREFERRED EMBODIMENTS

Figure 1:
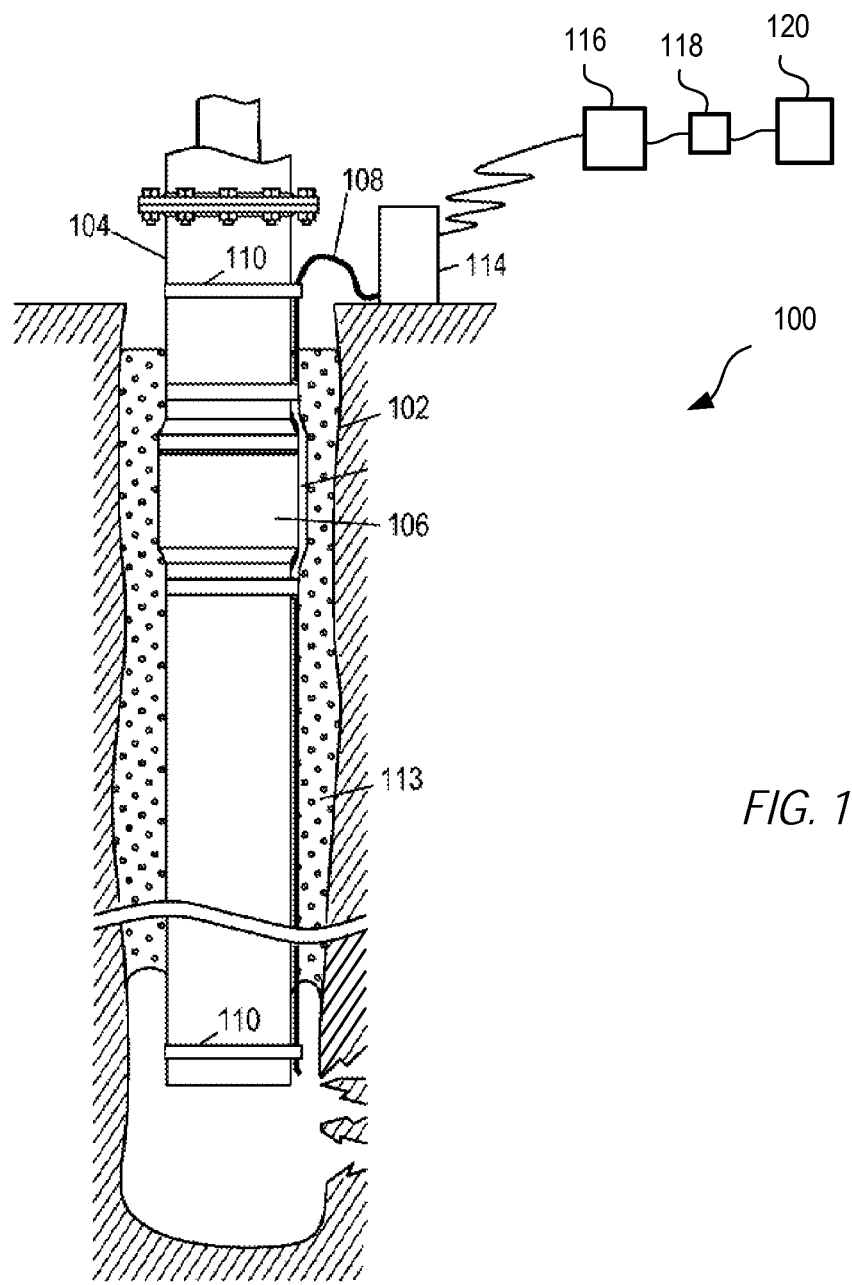
FIG. 1 shows a borehole with an optical fiber based sensing system therein.

The following description refers to the accompanying drawings that show various details of examples selected to show how the present invention may be practiced. The discussion addresses various examples of the inventive subject matter at least partially in reference to these drawings, and describes the shown examples in sufficient detail to enable those skilled in the art to practice the invention. Many other examples may be utilized for practicing the inventive subject matter than the few illustrative examples discussed herein, and many structural and operational changes in addition to the alternatives specifically discussed herein may be made without departing from the scope of the inventive subject matter.

In this description, references to "one example" or "an example" mean that the feature being referred to is, or may be, included in at least one example of the invention. Separate references to "one example" or "an example" in this description are not intended to necessarily refer to the same example; however, neither are such examples mutually exclusive, unless so stated or as will be readily apparent to those of ordinary skill in the art having the benefit of this disclosure. Thus, the present invention can include a variety of combinations and/or integrations of the examples described herein, as well as further examples as defined within the scope of all claims based on this disclosure, as well as all legal equivalents of such claims.

Several example fiber-based sensing system topologies are described in detail below, in which pulsed light is directed along an input fiber, the light interacts with multiple acceleration and/or acoustic sensors disposed along the length of the fiber and then returns along an output fiber, and is processed to extract detected values of acceleration and/or acoustic vibration from a spectrum of the return light. In some examples the sensing system performs coarse wavelength division multiplexing (CWDM) to extract four channels of data from the return light, performs wavelength division multiplexing (WDM) to detect shifts in peak wavelength within each data channel, and performs time-division multiplexing (TDM) to associate particular sensed values with the corresponding sensors along the output and input fibers.

A light source is described in detail below, in which light beams spanning different wavelength bands from two or more, separate light-producing elements (or "emitters") are pulsed separately using a common trigger, to form synchronized pulses that are combined and then amplified. The output of the light source is broadband, high-powered pulsed light. The described light source is an example, and other suitable light sources may also be used.

A distributed fiber optic sensing system is a particularly useful tool in many operations in the oil and gas wells. An example use is as a seismic sensing system which may be temporarily installed in a wellbore; or may be temporarily placed, such as in a string within an open hole or cased well. Such a seismic monitoring system will typically include a plurality of sensors distributed along the length of a borehole (or possibly along the earth's surface). The sensors detect one or more physical properties associated with a seismic event, such as acceleration and acoustic vibration, and convert the sensed properties to one or more optical signals which are then communicated through an optical fiber to a central processing assembly for further processing. In many example systems, the central processing assembly also includes a light source emitting light at appropriate wavelengths and that is communicated across one or more optical fibers to the sensor array, or at least a portion thereof. In one example, the central processing assembly analyzes the received optical signals, such as the signal spectrum, to determine the sensed physical properties for each sensor. In the case of a seismic sensing system, once the sensed physical properties are determined, the central processing assembly may use well-known triangulation methods to pinpoint a location and/or an intensity of a particular detected seismic event.

Such distributed optical systems offer many advantages for some applications. For example, transmission of an optical signal along a fiber is largely immune to electrical noise in the surroundings. In addition, many optical sensors operate passively, without requiring batteries or a supply of electrical power from outside the borehole. Furthermore, because the materials in an optical fiber are types of glass, or have chemical compositions that are close to glass, the fibers may be more resistant to corrosion than comparable metallic conductors.

FIG. 1 is a schematic drawing of an example distributed optical sensing system 100. System 100 is shown as permanently installed in a well, although temporary placement is also contemplated, and installation in other environments and/or for other purposes is also contemplated.

Figure 14:
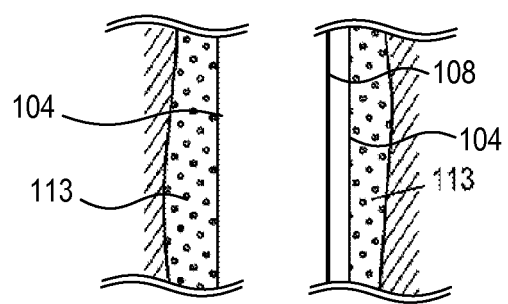
FIG. 14 shows an alternative application, with an optical fiber based sensing system extending within the casing in a borehole.

System 100 is disposed in a borehole 102 in association with a casing string 104 installed in borehole 102. In this example, a fiber optic cable assembly 108 has been attached to the exterior of the casing string 104 with straps 110, and may be protected in various locations by optional cable protectors. In other examples, the fiber optic cable 108 assembly may be attached to a different portion of the casing string, such as its interior; or may be attached by another suitable element other than straps, and/or may include further protection elements. In some alternate applications wherein the fiber optic cable assembly will be disposed within the casing of a well, as depicted in FIG. 14, or within tubing in that casing, the fiber optic cable assembly may include anchors or other devices known to the art to couple the assembly, and particularly the sensors thereof, to the adjacent surfaces; though such will not be required of all systems in which the systems may be of benefit.

The fiber optic cable 108 assembly includes multiple sensors 106 attached to the cable along the length of the cable. The casing string 104 is secured within the borehole by a cement slurry 113, which when cured mechanically couples the sensors to the surrounding earth, so that the sensors can detect seismic activity originating outside the borehole 102. The fiber optic cable 108 is attached to a processing assembly indicated generally at 114, which is typically at the surface. Processing assembly 114 supplies light to the fiber or fibers in fiber optic cable 108 through a light source 116. Processing assembly 114 also receives the returned optical signals from fiber optic cable 108, and processes the signals, through use of an interrogation module 118 and a processing unit 120, for example to determine sensed physical properties from the sensors. Although acceleration and acoustic vibrations are the physical parameters discussed in the following sections, other suitable physical parameters that may be sensed by a fiber-based sensing system can include pressure, strain, deformation, and velocity. In many example systems, fiber optic cable 108 will include a plurality of optical fibers, and preferably a first one or first plurality of such fibers will be coupled to communicate broadband light from processing assembly 114 (which will include, in many examples, a plurality of light emitters) to sensors coupled thereto; and a second one or a second plurality of such fibers will be coupled to receive optical signals from such sensors and to communicate the signals to processing assembly 114.

Processing assembly 114 (which may include a conventional "computer" (in any of a variety of known forms) will provide a suitable user interface and can provide control the system operation and provide for the receiving, storage, and retrieval of data from the system. In many examples, processing assembly 114 will include one or more processors in combination with additional hardware as needed (volatile and/or non-volatile memory; communication ports; I/O device(s) and ports; etc.) to provide the example functionalities as described herein, and additional functionalities as will be apparent to those skilled in the art. An example processing assembly 114 can serve to both control functions of the system (including sending of light pulses through the optical cable 108 to the sensors) and also to receive and process measurements from the sensors; and further to perform such processing as is needed to determine the sensed formation properties and other related information as may be desired to be determined in essentially real time. In many examples, one or more a non-volatile, machine-readable storage devices (e.g., a memory device (such as DRAM, FLASH, SRAM, or any other known form), a hard drive, or other mechanical, electronic, magnetic, or optical storage mechanism, etc.) will contain instructions suitable to cause the processor to perform the desired functionality, such as the various examples discussed herein). Of course, some of these functions may be implemented by separate components within processing assembly 114 (which components may themselves be or include processing assemblies), as desired; and/or additional functions may be performed by such one or more processing assemblies in response to similarly stored instructions. Such distribution of functions, in general, is well-known in the art for controlling and receiving data from measurements systems within a well.

The following sections discuss various aspects of the sensing system. The "LIGHT SOURCE" section describes a light source that can produce high-powered, broadband pulses, which are suitable for use in the sensing system. The "SENSOR" section describes a sensor capable of receiving the pulses and imparting one or more particular optical effects on the pulses that are indicative of one or more sensed physical properties from the sensor. Typically, the sensor includes three accelerometers arranged along orthogonal directions, in order to sense a full three-dimensional vector value of acceleration. The "SENSOR" section describes suitable accelerometers as well. The "SENSING SYSTEM OVERVIEW" section describes a generic system topology. Four "EXAMPLE" sections describe four example system topologies. The "EXAMPLE METHODS OF OPERATION" section discusses methods of operation for the light source and for the sensing system. In general, it is assumed that light propagates within the system, from component to component, through conventional multi-mode or single-mode optical fibers. In addition, the term "light," as used herein, is not limited to the visible light portion of the electromagnetic spectrum, and may include all or at least a portion of the ultraviolet, visible, near infrared, mid-infrared, and/or far infrared portions of the electromagnetic spectrum.

Light Source

While many configurations of light source may be utilized in the inventive systems as described herein, in many embodiments, the light source 116 will be a relatively high power, pulsed, broadband source. Because sensors (as discussed below) may significantly attenuate the light that passes there through, the light source should have a relatively high power. For example, a power in the range of a few hundred milliwatts (mW) peak will be satisfactory for many applications, though sources operating outside this range may be suitable for some system configurations. For purposes of the present disclosure, the term "high power" as to a light source output will refer to a power at or exceeding 100 (mW) peak, as measured at the light source output to a fiber optic or other transmission mechanism.

The pulsed source enables use of time-division multiplexing (TDM) for communication with the sensors along a single fiber or along a relatively few number of fibers (compared with the number of sensors). Light source 116 will preferably provide light across a spectrum that is sufficiently broad to facilitate a desired number of channels as will facilitate obtaining individualized signals from each sensors in the system configuration of interest. Thus the spectral width of light source 116 will, in most embodiments, span all of the various channels used by the sensors. For purposes of the present specification a broadband source will be a source comprising wavelengths spanning a range of at least about 80 nm, though the wavelengths need not be continuous across the entirety of such range.

For example, in the illustrative examples below, the sensor operates in a band within wavelength range from 1530 nm to 1610 nm, which occupies all of the telecommunications C-band (1530 nm to 1565 nm) and a portion of the telecommunications L-band (1565 nm to 1625 nm). These wavelength ranges are desirable due to their low loss levels in many single-mode and multi-mode optical fibers, though other suitable wavelengths may be used as well. Those skilled in the art will recognize that the definitions of C-band and L-band used herein are those that are conventionally used for optical fiber-based telecommunications systems, and are not the same C-band and L-band that are used for over-the-air communication systems or microwave systems. Typical off-the-shelf components from the field of telecommunications are usually designed for the C-band or for the L-band, but not for both simultaneously. For example, typical pulse modulators are available in either the C-band or the L-band, but these typical pulse modulators do not work in both bands simultaneously.

Figure 2:
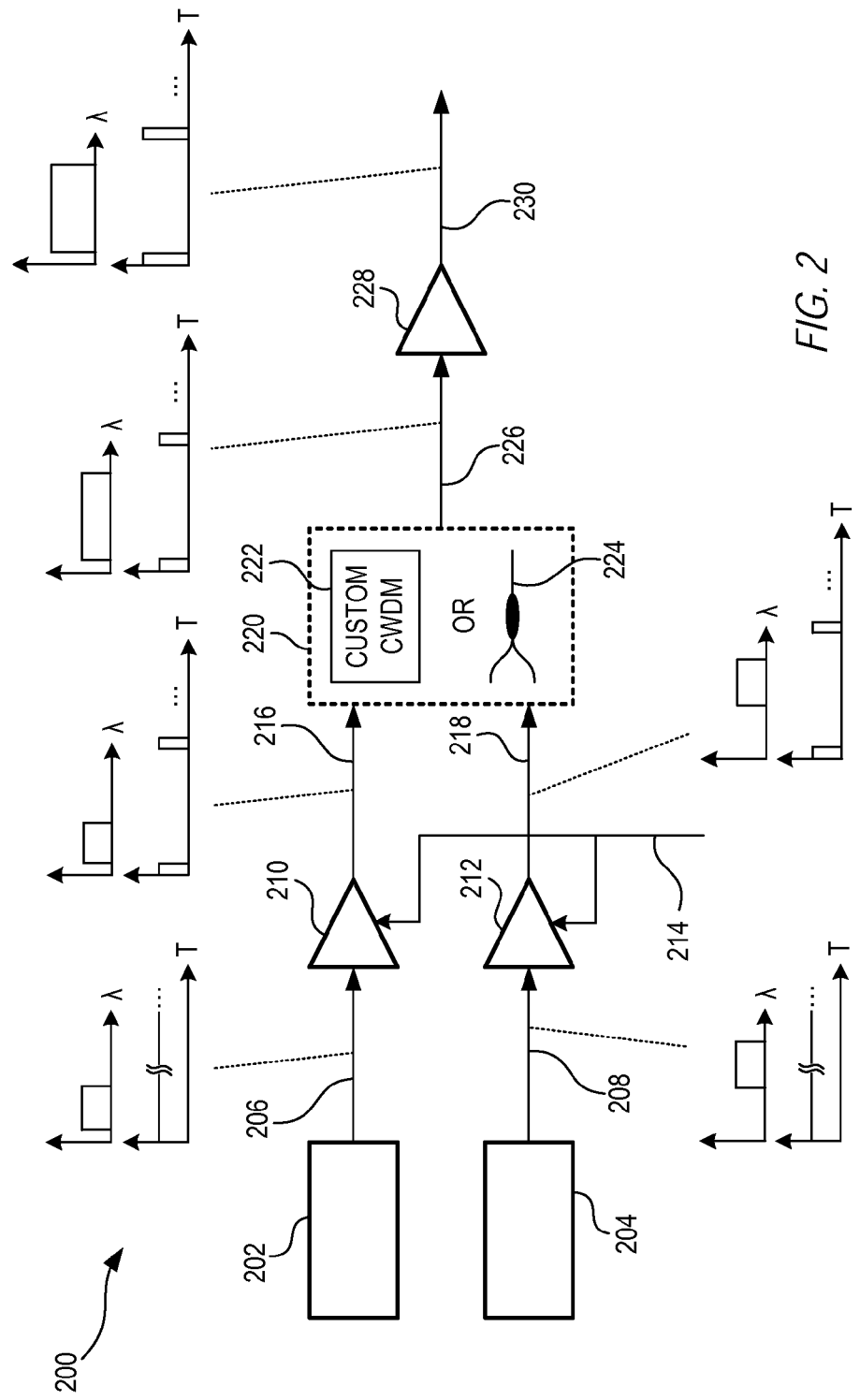
FIG. 2 shows a schematic drawing of a high-power, broadband, pulsed light source.

FIG. 2 schematically shows an example of a light source 200 that can address the above considerations, and thus would be suitable for use in example system 100 of FIG. 1, for example as light source 116 of processing assembly 114 in that Figure. Two separate light-producing elements each produce low-power, non-pulsed light beams in different wavelength ranges, such as the C-band and the L-band. The two low-power non-pulsed beams are each pulsed separately, with the pulses being triggered by a common trigger, so that they form synchronized low-power pulses. The synchronized low-power pulses are combined to form broadband low-power pulses. The broadband low-power pulses are then amplified to form broadband high-power pulses, which are suitable for use in the sensing system. In other examples, more than two light-producing elements may be used.

The light source 200 includes a first light producing element 202, which produces non-pulsed (e.g., continuous-wave) light 206 in a first wavelength band. A suitable first wavelength band may be the telecommunications C-band, which spans the wavelength range of 1530 nm to 1565 nm. A suitable spectral bandwidth for the first light producing element may be 40 nm. Other suitable wavelength ranges and bandwidths may also be used. The light source 200 includes a second light producing element 204, which produces non-pulsed light 208 in a second wavelength band, which is different from the first wavelength band. A suitable second wavelength band may be the telecommunications L-band, which spans the wavelength range of 1565 nm to 1610 nm. A suitable spectral bandwidth for the second light producing element may be 40 nm. Other suitable wavelength ranges and bandwidths may also be used, and more than two light producing elements may also be used.

An example light-producing element (e.g., an emitter) that is well suited for use in the light source 200 is an Amplified Spontaneous Emission (ASE) light source, which is typically formed from a piece of Erbium doped fiber pumped by a high power 980 nm or 1480 nm laser. Another example light-producing element that is well suited for use in the light source 200 is a Superluminescent Diode (SLD). In some examples, both light producing elements 202, 204 are ASE sources. In other examples, both light producing elements 202, 204 are SLD sources. In still other examples, the two light producing elements 202, 204 include both an ASE and an SLD. Other suitable emitters may be used as well.

The non-pulsed light 206, 208 at the first and second wavelength bands is directed into respective first and second amplifiers 210, 212. The amplifiers 210, 212 are both triggered by a common trigger signal 214, which is typically a periodic electrical signal that oscillates between a low voltage and a high voltage. The trigger signal may be generated by an interrogation module, a demodulator, an external device, or any other suitable device capable of delivering a periodic electrical signal with a desired frequency. For each cycle of oscillation, the amplifiers 210, 212 form one pulse in their respective output beams. Because the amplifiers 210, 212 trigger from a common trigger signal 214, the light from the light producing elements 202, 204 is pulsed simultaneously, and the pulses produced by the amplifiers 210, 212 are synchronized. The outputs from the first and second amplifiers 210, 212 are pulsed light 216 in the first wavelength band, and pulsed light 218 in the second wavelength band, respectively. An example amplifier that is well suited for use in the light source 200 is a Semiconductor Optical Amplifier (SOA).

A beam combiner 220 sums the pulsed light 216 in the first wavelength band and the pulsed light 218 in the second wavelength band, to form broadband pulsed light 226. The broadband pulsed light has a spectral width that spans both the first and second wavelength bands. In some cases, the broadband pulsed light 226 can have a wavelength spectrum that spans both the telecommunications C- and L-bands.

An example beam combiner that is well suited for use in the light source is a custom coarse wavelength division multiplexer (CWDM) 222. The custom CWDM 222 uses one or more wavelength-sensitive elements to efficiently combine the light in the first and second wavelength bands. For instance, the CWDM 222 typically uses a wavelength-sensitive coating that reflects one wavelength band but transmits the other wavelength band; such a coating may be used to superimpose the light in one wavelength band onto the light from the other wavelength band. In general, such wavelength-sensitive elements are relatively efficient in combining light in two different wavelength ranges. Another example beam combiner that is well suited for use in the light source is a 2-by-1 coupler 224. Such a coupler 224 is typically less expensive than a CWDM 222, but is not as efficient. A 2-by-1 coupler 224 typically does not rely on wavelength-sensitive elements to perform the beam combination, and as a result, has an output that is typically somewhat lower than the CWDM 222. The CWDM 222 and the coupler 224 are just two examples; other suitable beam combiners may be used as well.

In some examples, the amplifiers 210, 212 may impart different gains to the two wavelength bands, so that the resultant summed pulses may have a desired wavelength spectrum. For instance, the amplifiers 210, 212 may statically or dynamically adjust their gains so that the output wavelength spectrum of the summed pulses is generally flat, or so that a desired spectrum is achieved. In some examples, the amplifiers 210, 212 may dynamically adjust their gains in response to feedback from one or more elements downstream, in order to produce a desired output wavelength spectrum. For instance, the relative intensities of the four output channels, obtained downstream, may be used to drive the dynamic adjustment of the amplifier gains.

The broadband pulsed light 226 is amplified by an amplifier 228 to form amplified broadband pulsed light 230. The amplifier 228 does not significantly affect the spectrum of the amplified light, and does not significantly affect the pulse duration or timing. An example amplifier that is well suited to produce the output light in the light source 200 is an Erbium Doped Fiber Amplifier (EDFA). Other suitable amplifiers may also be used.

After amplification, the amplified broadband pulsed light 230 is directed out of the light source 200 through an output fiber or other optical coupling, such as to deliver the pulsed light 230 to other portions of a system. The amplified broadband pulsed light 230 produced in this manner may have a peak power of up to one thousand mW or more (>30 dBm), which should be suitable for powering an example sensing system having, as just one example, up to 40 TDM levels to provide a total of 160 channels.

Generally, such pulses cannot be produced by the use of a single off-the-shelf light source developed for the telecommunications industry. But, using the techniques discussed herein, multiple off-the-shelf sources can be used together to provide the appropriate extended wavelength spectrum. Although two light producing elements 202, 204 and two amplifiers 210, 212 are used in the example of FIG. 2, it will be understood that more than two of each may be used to extend the wavelength spectrum of the light source 200 as needed. For example, the light source may include three, or more than six light producing elements and amplifiers. Additionally, for particular examples that may utilize a narrower spectrum, such as a system that uses fewer than four channels, or a system in which the dynamic range is reduced so that the data channels have a reduced width, the light source may include only a single light producing element.

Sensor

Figure 3:
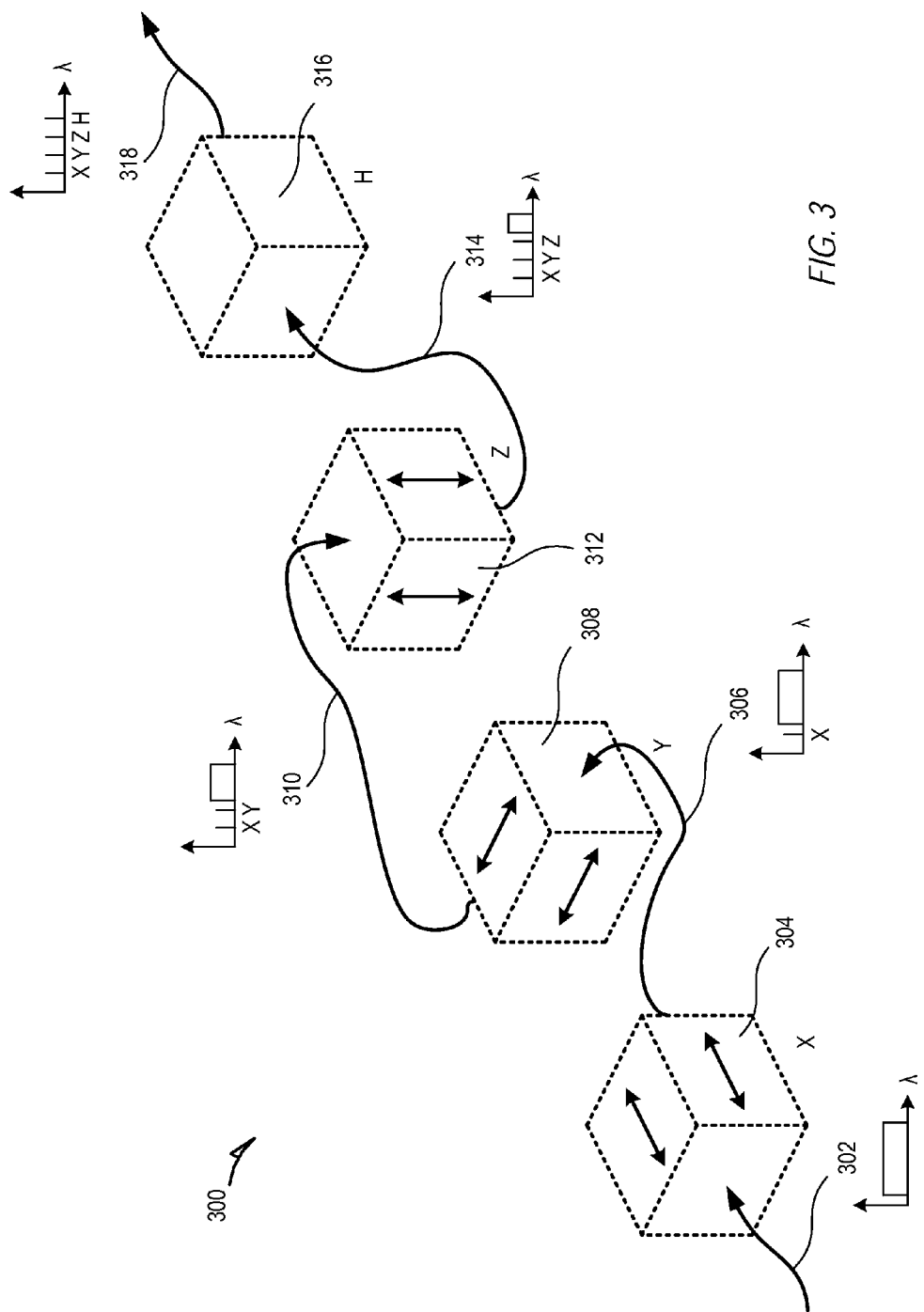
FIG. 3 shows a schematic drawing of the optical path in a sensor traversing multiple accelerometers, and the associated optical spectrum at various points in the optical path.

FIG. 3 is a schematic drawing of a single sensor 300, of the type that may be coupled to an optical fiber along its length in the sensing system. Light enters through optical fiber 302 and exits through optical fiber 318. It is assumed that the optical elements between fibers 302 and 318 are packaged in a known manner within a sealed housing (not shown), so that the sensor may be resistant to a harsh environment. In general, a rigid, sealed housing is preferable for sensors that detect only acceleration or acoustic vibrations mechanically coupled to a respective transducer, since physical exposure of the transducer to the environment or medium surrounding the sensor is not needed (e.g., in contrast to a pressure sensing application, wherein a portion of the transducer may be coupled to or surrounded by a propagation medium such as a gas or liquid). The housing may be formed as a cylinder, and may be made from a metal that is suitably resistant to corrosion. Other suitable housings may also be used.

FIG. 3 shows an optical path within the multiple sensor package 300, as the path passes serially through four sensors that are disposed within the housing. Three of the accelerometers are arranged to have sensitivity to accelerations along mutually orthogonal directions. A fourth sensor is included to measure acoustic vibrations, which may be designed in a known manner to be largely or wholly direction-insensitive. The acoustic vibrations-dedicated sensor (a hydrophone) functions in a manner similar to those of the other three accelerometers, but without the directional sensitivity.

The three orthogonally-oriented accelerometers can provide X-, Y-, and Z-component values of acceleration, which together form a full acceleration vector having a direction and a magnitude. FIG. 3 schematically shows the X, Y, and Z directions with the arrows shown within elements 304, 308, and 312, respectively. It will be readily understood that X, Y, and Z, as used herein, are intended only to signify three arbitrary, mutually orthogonal directions, and as such, are relative directions, not absolute directions. In practice, a sensor can be calibrated with its surroundings to convert the values obtained from its three mutually-orthogonal accelerometers into any suitable coordinate system. The acoustic vibrations-dedicated sensor is abbreviated herein as H.

The four sensors produce signals in four corresponding channels, with the channels being denoted by the shorthand of (X, Y, Z, H). Although the example sensor package uses four sensors and produces data in four corresponding channels, it will be understood that any suitable number of accelerometers and corresponding channels may be used, from one to four, or to eight or more. Although light is shown as passing through the sensors in the order of X, then Y, then Z, then H, it will be understood that the light may pass through the sensors in any suitable order.

The four channels (X, Y, Z, H) may be respectively assigned to occupy four adjacent bands of wavelengths, where each band has an upper wavelength and a lower wavelength that remain invariant over the life of the sensor 300. In the numerical examples discussed herein, each wavelength band has a width of 20 nm, and the full four-channel output has a total width of 80 nm. It will be understood that the use of four channels having a spectral width of 20 nm is an example, and that other suitable numbers of channels and channel spectral widths may also be used.

As will be discussed below, the signal produced by each accelerometer is in the form of a relatively narrow band of wavelengths transmitted within the particular 20 nm-wide channel. As the accelerometer moves in response to a sensed acceleration, the peak wavelength of the relatively narrow transmitted band shifts within the 20 nm-wide band. Such shifting may be on the order of up to +/−5 nm to +/−7 nm, at its maximum, away from a center of the 20 nm-wide band. The maximum shifting of the peak wavelength is intended to be less than a half-width of the data channel, or less than 10 nm for the example of a 20 nm-wide data channel. The resolution of such a wavelength shift may be significantly smaller than the maximum displacement of 5 nm or 7 nm, with wavelength sensitivities typically on the order of than 0.1 nm or less.

In the example optical path shown in FIG. 3, light enters the sensor 300 along fiber 302. The entering light is broadband, and has a wavelength spectrum that extends across all four data channels X, Y, Z, H. As the light passes from sensor to sensor within the sensor package 300, each sensor produces an output optical signal measuring one of the physical parameters by varying a characteristic of the light. In the example sensor package 300, the physical parameters being measured include acceleration and acoustic vibrations; in other examples, the physical parameters can include pressure, strain, deformation, and velocity. In the example sensor package 300, the output optical signal is in the form of a single transmitted wavelength (or a relatively narrow band of transmitted wavelengths) within a range of wavelengths allocated for a particular data channel; light enters a sensor with a relatively broad spectrum that extends over a data channel, and exits the sensor with a relatively narrow spectrum within the data channel. In the example sensor package 300, the characteristic of the light that varies in response to the measured physical parameters is a peak wavelength of the transmitted light.

The entering light 302 passes through an X accelerometer 304, which is sensitive to a component of acceleration along the X-direction. Upon exiting the X accelerometer 304, the light 306 has a signal in the X channel imparted by the X accelerometer 304, which appears as a single transmitted wavelength (or a relatively narrow band of wavelengths) within the 20 nm-wide band of wavelengths designated for the X channel. As the sensor experiences acceleration having a component along the X-direction, the peak transmitted wavelength shifts within the X channel, but remains within the X-channel during operation. Upon exiting the X accelerometer 304, the light 306 outside the X channel is largely unaffected by the X accelerometer and still has a relatively broad spectrum in the other three channels Y, Z, H.

The light 306 then passes through a Y accelerometer 308, which is sensitive to a component of acceleration along the Y-direction. Upon exiting the Y accelerometer 308, the light 310 has a signal in the Y channel imparted by the Y accelerometer 308. Outside the Y channel, the light 310 is largely unaffected by the Y accelerometer 308, and retains its signal in the X channel and its broadband spectrum in the Y and Z channels.

The light 310 then passes through a Z accelerometer 312, which is sensitive to a component of acceleration along the Z-direction. Upon exiting the Z accelerometer 312, the light 314 has a signal in the Z channel imparted by the Z accelerometer 312. Outside the Z channel, the light 314 is largely unaffected by the Z accelerometer 312, and retains its signals in the X and Y channels and its broadband light in the H channel.

The light 314 then passes through an H hydrophone 316, which records an acoustic signal but generally lacks the directional sensitivity of the X, Y, and Z accelerometers. Upon exiting the H hydrophone 316, the light 318 has a signal in the H channel imparted by the H hydrophone 316. Outside the H channel, the light 318 is largely unaffected by the H hydrophone 316, and retains its signals in the X, Y, and Z channels.

Upon exiting the four sensors (in whatever order the light passes through them), the light 318 includes signals in all four channels X, Y, Z, H, and then exits the sensor package 300.

Figure 4:
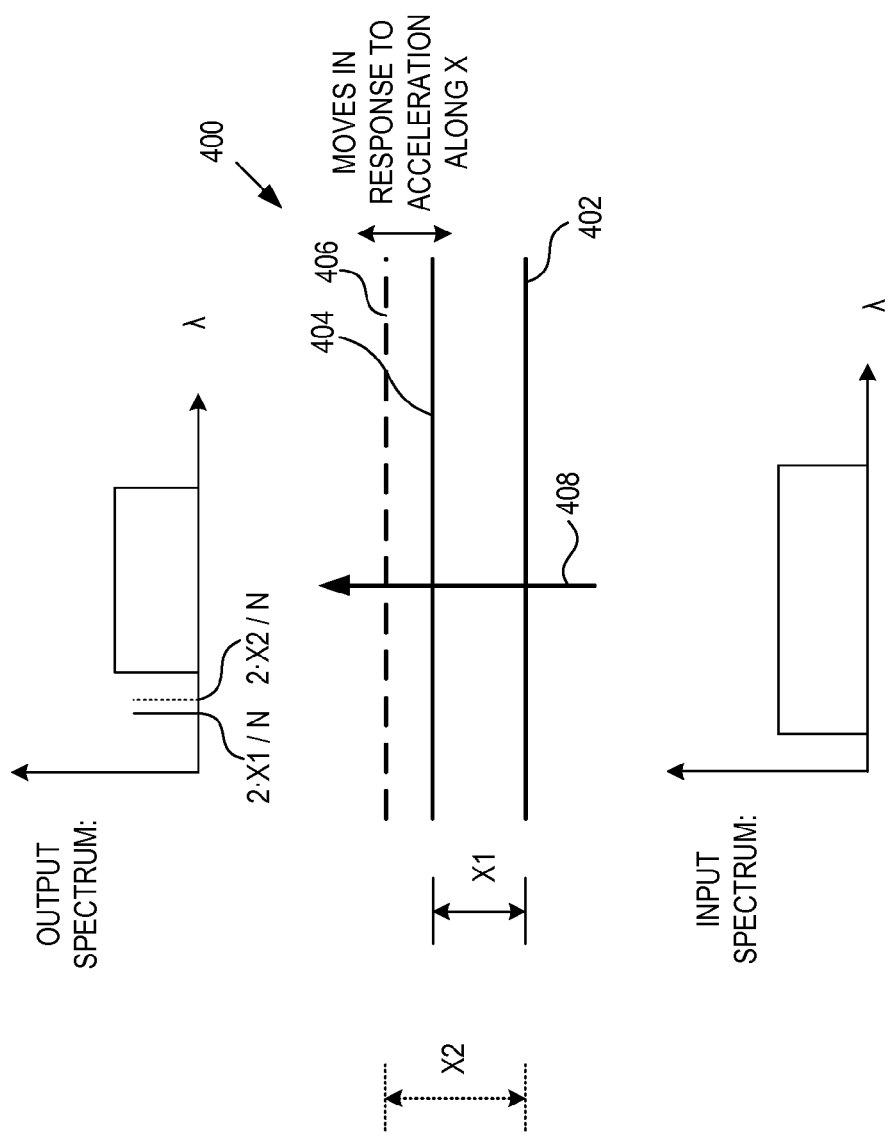
FIG. 4 shows a schematic drawing of a Fabry-Perot cavity suitable for use in an accelerometer in the sensor.

FIG. 4 is a schematic representation of an example Fabry-Perot cavity 400 that may be used in each of the sensors in the sensor package. Note that in an actual sensor, the plurality of these cavities will be oriented suitably to have sensitivities along the desired directions. In the diagram of FIG. 4, the light 408 passes upwards through the cavity, along the X direction (X being arbitrary). The cavity is responsive to acceleration having a component along this vertical X-direction. Note that cavity 400 of FIG. 4 is shown for the X-direction; cavities that are sensitive to the Y- and Z-directions are similar in structure, but are oriented suitably to be sensitive to accelerations in the Y- and Z-directions.

The Fabry-Perot cavity is formed between a surface 402 and a parallel surface, shown as solid 404 when the accelerometer senses a first acceleration value, and shown as dashed 406 when the accelerometer senses a second acceleration value different from the first acceleration value. The separation between the surfaces is shown as being X1 and X2 for the first and second acceleration values, respectively.

Fabry-Perot cavities have a relatively high transmission when the optical path within the cavity is an integral number of wavelengths, and a relatively low transmission otherwise. As the cavity spacing varies during operation, the wavelength that satisfies the integral-number criterion also varies, and the peak wavelength of the transmitted light shifts within the particular data channel. The transmitted wavelengths are shown in FIG. 4 as being 2·X1/N and 2·X2/N for the first and second acceleration values, respectively, where N is an integer. Note that the cavity spacing, and therefore the value of N, is selected so that during operation, only one wavelength within the particular data channel is transmitted. It is assumed that the refractive index inside the cavity is unity; the relationship between transmitted wavelength and cavity separation may easily be modified to include a non-unity refractive index, if desired. Note that outside the X channel in FIG. 4, the spectrum of the light is unaffected; this arises as a result of particularly desirable wavelength-sensitive properties of thin-film coatings that form the reflective surfaces of the cavity, which are explained below with reference to FIG. 6.

It will be understood that in practice, the transmitted wavelength is actually a narrow range of wavelengths having a peak wavelength value and having a narrow, but non-zero, width. As will be discussed later, the quantity of interest for the transmitted wavelength is the peak wavelength value, where the narrow, but non-zero, width is preferably kept as small as is practical. Note that it is relatively straightforward to correlate a particular motion of a wavelength peak to a physical motion between the reflectors in a cavity, and also to a value of acceleration that produces the physical motion. The equations of motion to perform this correlation are well-known to those of skill in the art.

Figure 5:
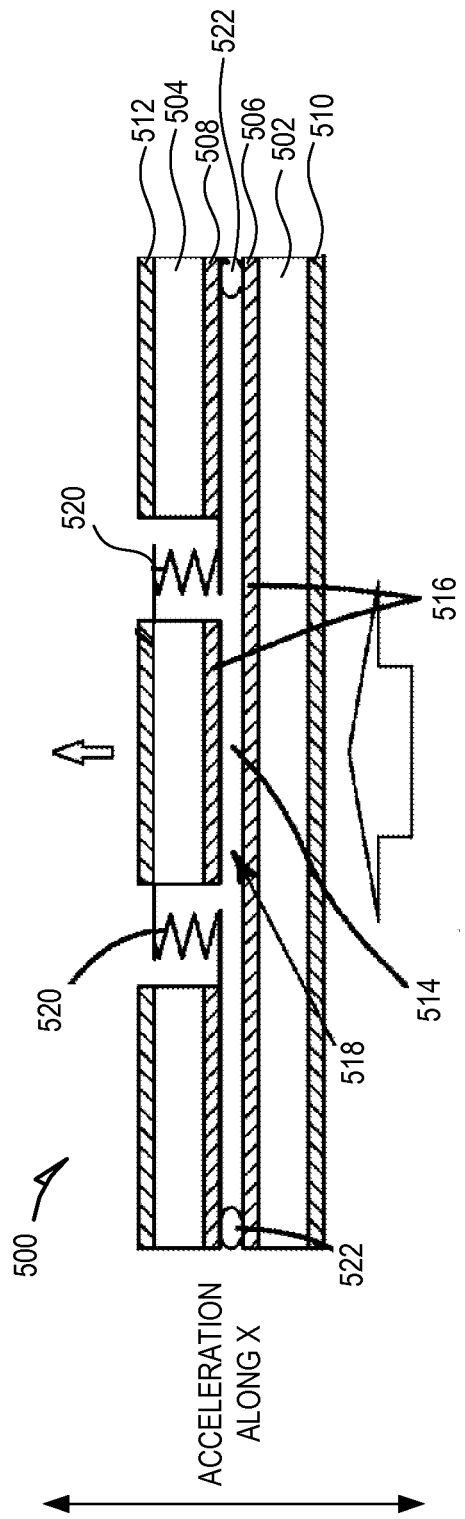
FIG. 5 shows a schematic drawing of a structure suitable for use as an accelerometer in the sensor.

FIG. 5 shows an example micro opto-mechanical system (MOMS) 500 that may be used to form the Fabry-Perot cavity in each of the four accelerometers in the sensor. The cavity 514 is formed between parallel and separated reflectors 516, each of which is a thin film structure having reflective properties that vary with wavelength. One of the reflectors 516 is formed as a thin film structure 506 on a cavity-facing surface of a transparent reference plate 502. The other reflector 516 is formed as a thin film structure 508 on a cavity-facing surface of a transparent frame 504. The reference plate 502 and the frame 504 also have respective surfaces facing away from the cavity 514, which both include respective anti-reflection coatings 510, 512. The anti-reflection coatings 510, 512 operate over the entire range of wavelengths used during operation of the sensing system.

The frame 504 has a movable portion 518 that is mechanically coupled to move with respect to the frame 504 by one or more flexures 520. The frame 504 and the reference plate 502 are aligned with respect to each other. In the example of FIG. 5, the frame 504 and the reference plate 502 are spaced apart by beads 522. The flexures 520 allow the spacing between the reflectors 516 to vary in the presence of an acceleration component perpendicular to the reflector surfaces (vertical in FIG. 5, and labeled as the X direction). The flexures 520 also ensure that the reflectors 516 remain parallel to each other during any acceleration-induced motion. The mechanical structure shown in FIG. 5 is an example, and other structures may be used instead. For example, the transparent elements that support the reflectors may be directly coupled to each other by springs, flexures, or other suitably deformable elements.

It is noted above that the reflectors 518 that form the Fabry-Perot cavities use thin-film coatings that have particularly desirable wavelength-sensitive properties. The coatings are designed for one of the four data channels, are designed to be highly reflective for wavelengths within the data channel, and are designed to have a low reflectance for wavelengths outside the data channel.

Figure 6:
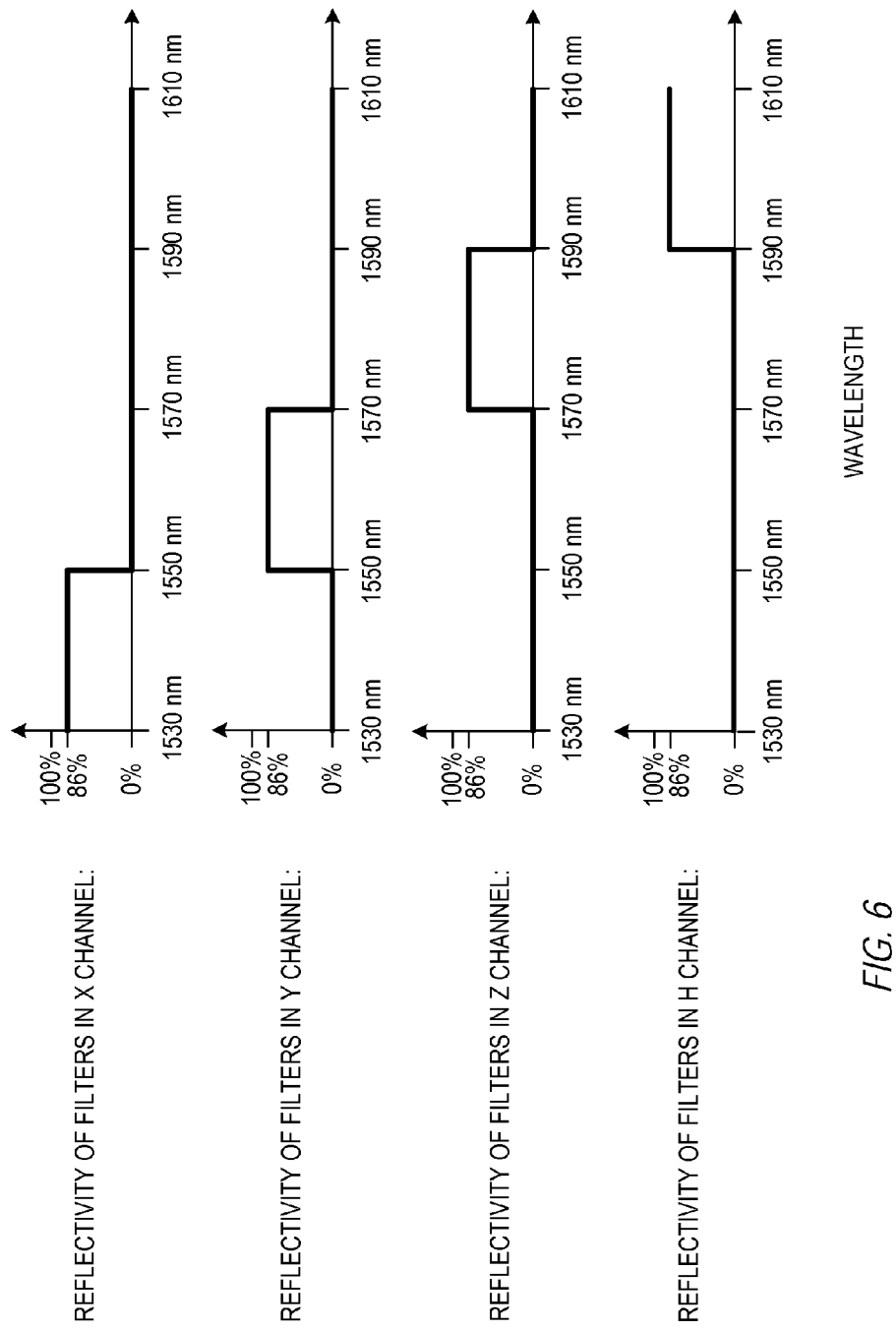
FIG. 6 shows plots of ideal thin-film coating performance for the sets of reflectors that form the cavities in the four accelerometers of the sensor.

FIG. 6 shows idealized plots for the thin-film coatings that are used on the reflectors to form the Fabry-Perot cavities in the four accelerometers in a sensor. For the X channel, light is highly reflective within the wavelengths allocated for the X channel, and has a low reflectivity at wavelengths that correspond to the Y, Z, and H channels. Likewise, each of the Y, Z, and H channels has high reflectivity within the Y, Z, and H channels, respectively, and low reflectivity outside the Y, Z, and H channels, respectively. For the example of FIG. 6, the X channel has a narrowband transmission region from 1530 nm to 1550 nm and has a wideband transmission region from 1550 nm to 1610 nm, the Y channel has a narrowband transmission region from 1550 nm to 1570 nm and has a wideband transmission region from 1530 nm to 1550 nm and 1570 nm to 1610 nm, the Z channel has a narrowband transmission region from 1570 nm to 1590 nm and has a wideband transmission region from 1530 nm to 1570 nm and 1590 nm to 1610 nm, and the H channel has a narrowband transmission region from 1590 nm to 1610 nm and has a wideband transmission region from 1530 nm to 1590 nm. Note that the wideband transmission region may be contiguous, such as for the X and H channels in the examples of FIG. 6, or may alternatively be discontiguous, such as for the Y and Z channels in the examples of FIG. 6.

Basically, the coatings used for one of the four channels are designed so that for the other three channels, the cavity effectively disappears, due to the low reflectivity at those wavelengths. For example, the coatings for the X channel are designed so that the Fabry-Perot cavity in the X accelerometer is visible to only the X channel, and is invisible to the Y, Z, and H channels. In this manner, light from the Y, Z, and H channels can effectively pass right through the X accelerometer with no cavity-like optical effects on the transmitted spectra. The regions of low reflectivity in FIG. 6 may be as low as is practical, with suitable values of low reflectivity including 0%, less than 0.1%, less than 0.25%, less than 0.5%, less than 1%, less than 2%, less than 3%, less than 5%, or less than 10%.

In many examples, the regions of high reflectivity are preferably within a range of 80% to 86%, and most preferably at approximately 86%, but may be as low as 70%. Note that the high reflectivity values in FIG. 6 should not equal exactly 100%; a 100% reflectivity is undesirable because no light would pass through the reflector. In general, as the reflectivity value is increased toward 100%, the finesse of the Fabry-Perot cavity increases, the spectral width of the transmitted wavelength decreases (desirably), but the amount of light transmitting through the cavity decreases, which reduces the amount of light returned from the sensor. In practice, for many example systems reflectivity values in the preferred range of 80% to 86% may provide a good compromise between spectral width and total amount of returned light.

The plots in FIG. 6 are idealized performance curves. In practice, a real coating does not show the step-like performance of FIG. 6, but shows some rounding at the transition between low reflectivity and high reflectivity, and also shows some ripple within the low reflectivity region and some ripple within the high reflectivity region. In practice, persons skilled in the art will be able to design a thin film structure that has a sufficiently high reflectivity in one 20 nm-wide wavelength band, and sufficiently low reflectivity in the other three 20 nm-wide wavelength bands to enable use of the cavities in a sensor and system in accordance with the guidance herein. Such a filter is commonly known as an edge filter (for the two outer bands), or a notch filter (for the two inner bands). The designs for both edge filters and notch filters are well known to those of ordinary skill in the art.

Sensing System Overview

The broadband, high-power, pulsed light source discussed earlier, along with a plurality of sensors of the type discussed earlier, are well-suited for use in a sensing system. An example of such a sensing system 700 is shown schematically in FIG. 7.

Figure 7:
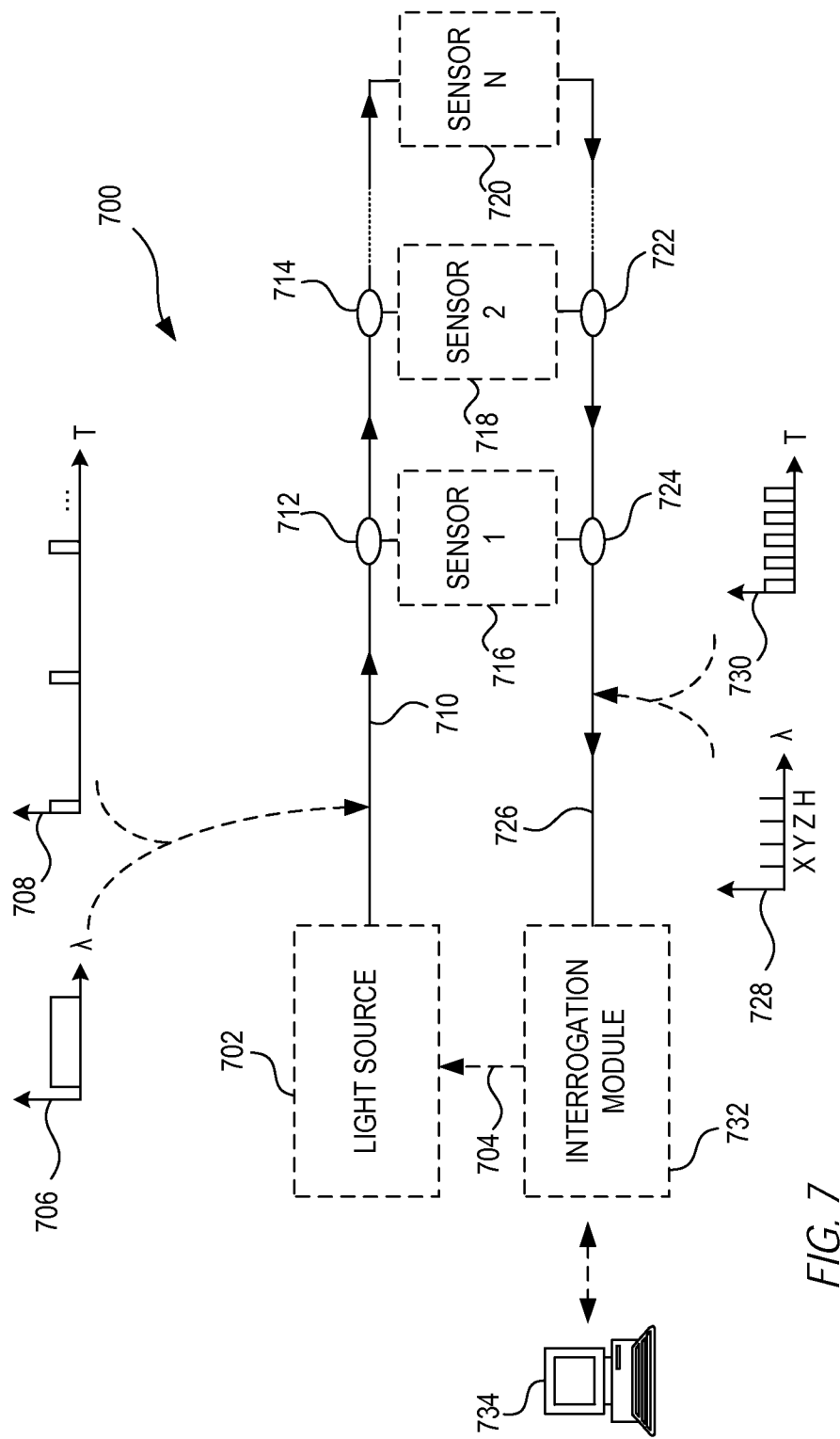
FIG. 7 shows a high-power, broadband, pulsed light source and sensors, as used in a sensing system.

In the example system 700 of FIG. 7, light is produced by a light source 702, which can be of the type discussed earlier, or can be another suitable light source. The output of the light source 702 is shown as being broadband in the wavelength ($\lambda$) plot 706, and being pulsed in the time-domain (T) plot 708. It will be understood that the plots 706, 708 are included only for convenience.

As discussed previously, light source 702 is typically included within a processing assembly. The light source 702 directs pulses onto an input optical fiber 710 (or alternatively into multiple fibers, as discussed earlier herein), which extends away from the measurement unit and into the environment to be measured, such as down the borehole. The input fiber(s) 710 may each be a conventional multi-mode or single-mode fiber. Light returns from the borehole along an output optical fiber 726, which extends proximate the input optical fiber 710 along its length, and is typically bundled with the input optical fiber 710 in the same single fiber optic cable. Again, not all sensors are necessarily coupled to the same output fiber 726. In most cases, the input 710 and output fibers 726 are distinct, although in some cases, they may be the same fiber.

The input fiber 710 is connected to a series of tap couplers that provide respective tap ratios (tapering up from sensor group 1 716 to sensor group N 720), to balance pulse powers delivered to each sensor group 1 through N. A time delay between respective sensor groups is selected to be slightly longer than a pulse width so as to avoid any temporal overlap of returned pulses (e.g., as shown in time domain plot 730). For example, the return fiber 726 carries a pulse train of N return pulses, each of which includes 3 (e.g., X/Y/Z) or 4 (e.g., X/Y/Z/H) CWDM wavelength peaks that respectively deliver information corresponding to 3 or 4 different physical parameters.

For example, each sensor group 716, 718, 720 dynamically senses a plurality of physical parameters, where the physical parameters are in a one-to-one correspondence with the wavelength bands corresponding to the data channels. Each sensor group 716, 718, 720 forms signal pulses from the received broadband pulses by transmitting only a single wavelength within each wavelength band, and each wavelength band has a dynamically-varying peak wavelength value indicative of the corresponding sensed physical parameter. Each sensor group directs the signal pulses along the output optical fiber 726 (or along a corresponding output fiber).

In the case of an N-level (e.g., N leg) system, such as shown FIG. 7, tap ratios for each respective pair of couplers (e.g., couplers 712 and 724 are a pair, and so on) should be tapered up, starting with a ratio of 1/N (e.g., for couplers 712 and 724) then 1(N−1) (e.g., for couplers 714 and 722), 1/(N−2), . . . , ⅓, and ½, to balance the returned pulse train (neglecting the coupler excess loss and fiber loss, which may also be taken into account to select or adjust respective tap ratios to maintain balance). The returned pulse height equals $1/(N^2)$ times of input pulse height $P_0$.

For example, in the case of N = 10:

No 1 coupler pair has $\frac{1}{10}$ cross-coupling and $\frac{9}{10}$ pass-through coupling ratio No 2 coupler pair has $\frac{1}{9}$ cross-coupling and $\frac{8}{9}$ pass-through coupling ratio No 3 coupler pair has $\frac{1}{8}$ cross-coupling and $\frac{7}{8}$ pass-through coupling ratio

⋮

No 9 coupler pair has $\frac{1}{2}$ cross-coupling and $\frac{1}{2}$ pass-through coupling ratio The light in the output fiber 726 is shown as including four wavelength peaks in wavelength ($\lambda$) plot 728. The peaks are indicative of signals within the X, Y, Z, and H data channels, as described above. The light in the output fiber 726 is also shown as being pulsed in the time-domain (T) plot 730.

An interrogation module 732 is coupled to the output fiber 726 and again is a part of processing assembly 734. The interrogation module 732 can include a demultiplexer coupled to the output fiber 726 for separating the output optical signals from different ones of the detectors. The term "module" is used herein to assist in clarity of the discussion of the interrogation functions, and is not intended to suggest any physical structure or other form of discrete device or functionality; and the interrogation modules functions can be implemented in any of a variety of ways through a processing assembly or by one or more dedicated devices capable of performing the needed functions. In some examples, the demultiplexer uses CWDM to separate the channels from one another. The interrogation module 732 can also include a converter for converting the output optical signals to electrical output signals and transmitting the electrical output signals to the processing assembly 734. Additionally, the interrogation module 732 can provide a periodic trigger signal 704 for the light source 702.

The converter can include an interferometer, which can convert a dynamically-varying value of peak wavelength into a dynamically-varying value of phase. In some examples, the converter converts the phase value to an intensity value that is representative of the sensed physical parameter, such as acceleration or acoustic vibrations. In other examples, the converter uses a time-of arrival to sense the phase. For instance, the converter may detect the particular time of a zero-crossing (such as for a periodic electrical signal), may compare the zero-crossing time to a reference time, and may use the difference between the zero-crossing time and the reference time to determine the value of the sensed physical parameter, such as acceleration or acoustic vibrations.

In some examples, the sensors are addressed sequentially. For example, a first pulse from the light source 702 is directed to a first sensor 716, and the information from the first sensor 716 is recorded by processing assembly 734. The next pulse from the light source 702 may be directed to a second sensor 718, and the information from the second sensor may be recorded by processing assembly 734. Once the final sensor 720 along the input 710 and output 726 fibers has been addressed, the sensor order may be repeated as often as needed.

Generally, the pulse repetition rate has an upper limit dictated by the round-trip time of a pulse to and from the furthest sensor along input fiber 710 and output fiber 726. The repetition rate may be high enough so that a single sensor is addressed hundreds or thousands of times each second. In general, there may be more than three sensors along the input 710 and output 726 fibers. In FIG. 7, the number of sensors is denoted by the integer value of N.

The periodic trigger signal 704 is typically a two-level electrical signal, with a low-level voltage and a high-level voltage. Transitions between the low-level voltage and the high-level voltage may be used to trigger the beginning and end of the light pulses from the light source. For instance, a transition from low-to-high voltages in the trigger signal 704 may be used to mark the beginning of a pulse, and a transition from high-to-low voltages in the trigger signal 704 may be used to mark the end of a pulse. As an alternate example, a transition from high-to-low voltages in the trigger signal 704 may be used to mark the beginning of a pulse, and a transition from low-to-high voltages in the trigger signal 704 may be used to mark the end of a pulse. In this manner, the light pulses from the light source 702 may be synchronized to the interrogation module 732, and may have a particular desired duty cycle (e.g., a proportion of a pulse width relative to a duration between successive pulses). In other examples, the duty cycle of the light source 702 may be independent of the interrogation module 732, so that the trigger signal may be used to mark the start of light pulses, but the pulses terminate according to a fixed duty cycle.

The interrogation module 732 receives the signal pulses from the output optical fiber 726. The interrogation module 732 performs time-division multiplexing (TDM) to associate each signal pulse with one of the plurality of sensors 716, 718, 720. The interrogation module 732 performs coarse wavelength-division multiplexing (CWDM) to separate the wavelength bands from one another within each signal pulse. The interrogation module 732 performs wavelength-division multiplexing (WDM) to determine the sensed physical parameter from each corresponding peak wavelength value for each signal pulse. In some cases, the interrogation module 732 determines the shift in peak wavelength away from the center wavelength of a respect data channel, for each of the four data channels. In some examples, the interrogation module 732 uses interference effects to convert a wavelength shift in the spectrum to a phase shift, and then detects the phase shift for each of the four data channels. In some examples, the interference effects occur in at least one Michelson interferometer in the interrogation module 732.

In discussions that follow, the channels are split apart and combined along an optical path by a coarse wavelength division multiplexer, or a CWDM. It is intended that a CWDM may have a resolution sufficient to separate the data channels from each other, which may have spectral widths on the order of 20 nm per channel, but may not have a resolution sufficient to determine a peak wavelength within a particular channel, which may require resolution on the order of 0.1 nm or less. The resolution of the peak wavelength is performed by a wavelength division multiplexer, or WDM. In general, a CWDM is a simpler element than a WDM. In some cases a CWDM may be a passive device having a wavelength-sensitive coating that can reflect one band of wavelengths while transmitting an adjacent band of wavelengths. For example, CWDM is used to separate the X channel, the Y channel, the Z channel, and the H channel from one another.

It will be understood that in many cases, if the desired quantity is acceleration, then several calculable intermediate quantities may be obtained between the sensing of the phase shift and the determination of an acceleration value. For instance, the wavelength shift may be obtained from the detected phase shift, although such a wavelength shift need not be explicitly determined by the interrogation module 732 or otherwise by processing assembly 734. Similarly, the detected phase shift may be converted to a separation between the reflective surfaces in a corresponding Fabry-Perot cavity to obtain an acceleration value, although such separation need not be explicitly determined by the processing assembly 734. In some cases, the processing assembly 734 may combine the information gathered from multiple sensors in order to determine a location and/or an intensity of a particular seismic event; in these cases, the acceleration itself may be an intermediate quantity that is used internally by the processing assembly 734 but is not presented to a user or otherwise output from the system. In cases where the desired quantity is not acceleration, but is another physical quantity such as pressure or velocity, there may also be intermediate quantities that need not be explicitly determined by the computing device 734 or presented to a user.

Four example interrogation modules are discussed in the following "EXAMPLE" sections. Each example includes a different configuration of the elements that perform the TDM, CWDM, and WDM, as described above. All four examples are well-suited for use in the sensing system 700 shown in FIG. 7. In addition, all four examples are fully compatible with the light source 702, the splitters 712, 714, the sensors 716, 718, 720, and the combiners 722, 724, all of which are omitted from FIGS. 8-11 for simplicity. In the first two examples, PGC is employed to modulate one of two arms of one or more interferometers. In the second two examples, the two arms of one or more interferometers include fixed phase shifts between the arms, which allow interference of the two arms without modulation of one of the arms.

The four examples discussed above are generally immune from polarization fading, which can result in variation of detected or demodulated optical information. When present, such fading can reduce a system signal-to-noise ratio or otherwise confound recovery of interferometrically-modulated optical signals carrying useful information because such information can be swamped by polarization variation at the detector or demodulator.

EXAMPLE 1

Figure 8:
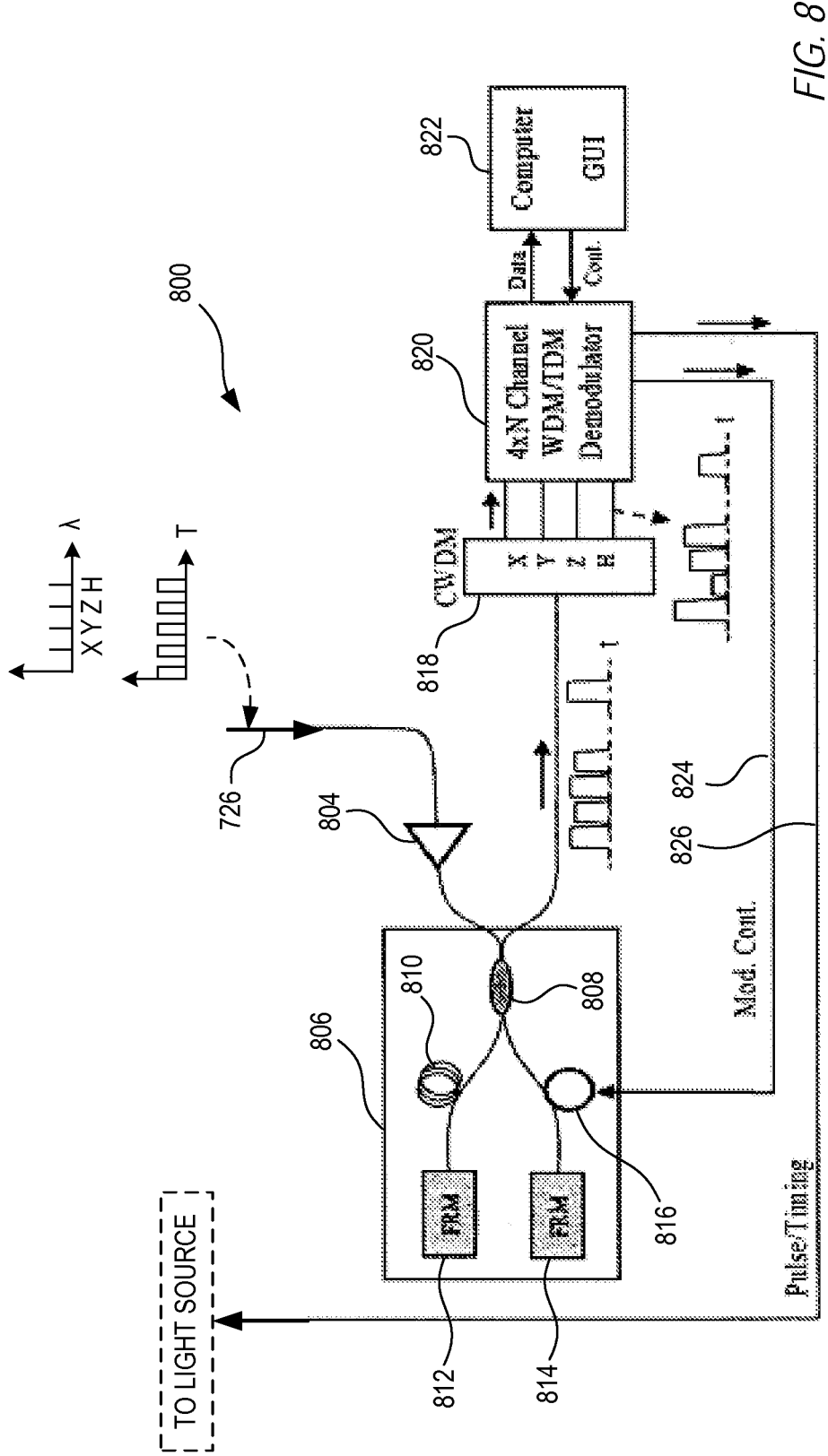
FIG. 8 shows a schematic drawing of an example of a topology for a WDM/TDM demodulator, as used in a sensing system.

FIG. 8 is a schematic drawing of a first example interrogation module 800, which includes a single Michelson interferometer 806 that converts a wavelength shift to a phase shift, followed by a CWDM 818 to separate the four data channels from one another, followed by a 4-by-N channel WDM/TDM demodulator 820 that converts a phase shift to an intensity that is detectable on a detector, and also matches a sensed set of spectra with the proper sensor. In some examples, as depicted in FIG. 1, the interrogation module, as well as the light source, may be considered as a part of the processing assembly 114.

In this example interrogation module 800, the output fiber 726 delivers pulsed light having a spectrum that may be analyzed to extract data sensed from a corresponding sensor. The spectrum has four peaks, where the peak wavelength of each peak is indicative of a sensed acceleration value. The pulses are delivered to an amplifier 804. An example of a suitable amplifier 804 is an EDFA. The output of the optical amplifier 804 has the same spectral content, showing four peaks, but with a higher amplitude for each peak.

The amplified pulses from the optical amplifier 804 then form the input to a Michelson interferometer (MCI) 806. In the Michelson interferometer, the input is split into two paths at a splitter/combiner 808. A first path in the Michelson interferometer includes a fixed delay coil 810 and terminates at a Faraday rotator mirror 812. Light traveling along the first path reflects at the Faraday rotator mirror 812, and returns along the first path through the fixed delay coil 810 to the splitter/combiner 808. The Faraday rotator mirror 812 rotates the plane of polarization by ninety degrees at the reflection. This ninety degree rotation of the plane of polarization can correct for random changes in birefringence that occur within the fiber, which might otherwise cause a deterioration in fringe contrast at the detector downstream. Other Faraday rotator mirrors in this example and in other examples function in the same manner.

A second path in the Michelson interferometer includes a piezoelectric transducer (PZT)-based modulator 816, which can vary the effective optical path length of the second path in a controllable manner. Light traveling along the second path reflects at the Faraday rotator mirror 814, and returns along the second path through the PZT-based modulator 816 to the splitter/combiner 808. The PZT-based modulator 816 is controlled by a periodic signal, typically sinusoidal in nature, so that the optical path length of the second path varies periodically, typically sinusoidally. The periodic signal is typically synchronized to the trigger signal that is fed to the light source. The depth of such a periodic signal is typically matched to the maximum phase shift that is to be detected in the interferometer, and the mathematical relationships that determine an optimal depth selection are well-known to those skilled in the art. Other PZT-based modulators in other examples function in the same manner, and are also synchronized to the trigger signal that is fed to the light source.

After the pulses from the first and second paths have reentered the splitter/combiner 808, the pulses interfere with each other. Such interference converts the wavelength information in the pulses into phase information. Mathematically, the phase Φ of the pulses, after interference, is given by $$\phi = 2\frac{2\pi n L}{\lambda} \quad (1)$$

where n is the refractive index of the fiber used in the Michelson interferometer 806, L is the optical path difference between the two arms of the Michelson interferometer 806, and λ is the center wavelength of the CWDM channel (1570 nm, for the example wavelength scheme shown in FIG. 6). The number "2" is at the front of the right-hand side of the equation to indicate a round-trip optical path difference.

One can take partial derivatives of both sides of equation (1) to arrive at an expression for phase shift, ΔΦ, as a function of wavelength shift, Δλ:

$$\Delta\phi = -\frac{4\pi n L}{\lambda^2}\Delta\lambda \quad (2)$$

where the wavelength shift, Δλ, is produced by the sensors, and may be formed as the difference between a transmitted wavelength and a center wavelength of the corresponding wavelength band. Alternatively, other suitable reference wavelengths, other than the center wavelength, may also be used in forming the wavelength shift.

After the pulses have interfered at the splitter/combiner 808, they are directed into a CWDM 818 that separates them by wavelength into four bands (for instance, the X, Y, Z, H bands). The four bands are directed along four separate fibers into a 4-by-N channel WDM/TDM demodulator 820. The demodulator 820 directs appropriate periodic electrical signals 824, 826 to the PZT-based modulator 816 and the light source, respectively. Data from the demodulator 820 is directed electronically to a processing unit 822 within a processing assembly, which can store the data, process the data, and/or present the processed data to a user through a GUI. The processing unit 822 can also control the demodulator 820.

One suitable demodulator 820 may be an off-the-shelf unit that has been modified for use with the sensing system, such as 700 in FIG. 7. For instance, a suitable commercially available unit that can be modified is a model TDI-7000 TDM Fiber Interrogator, sold by OPTIPHASE® of Van Nuys, Calif. In many examples, it would be preferred to replaces an internal high coherence light source which comes with the unit, with the pulsed, high-powered, broadband light source 200 shown in FIG. 2. Further, it would be preferable replace a source side internal compensator, which is designed for an optical path difference of over 40 meters, with a receiver side readout interferometer having an optical path difference of around 1 or 2 mm. An additional modification may include removing the polarization diversity receiver (PDR) with a tri-mask, and instead using a single photo-receiver; as the PDR has a correction for polarization fading that is not needed for these example detection schemes, and would otherwise create an unnecessary loss of optical power.

In the interrogation module 800 of FIG. 8, note that one arm of the Michelson interferometer is modulated by the PZT-based modulator 816. This PZT-based modulator 816 expands and contracts the optical path length of one arm of the interferometer periodically with a particular depth. In conventional interferometers, the periodic expansion and contraction has a particular depth optimized to a center wavelength of the light to be used in the interferometer. However, in the disclosed example system, the light in the interferometer spans four different wavelength bands, rather than a single wavelength band. The particular depth can only have a single value, which cannot simultaneously be optimal for all four wavelength bands. As a result, for many example systems, the particular depth will be chosen based on a wavelength approximately in the center of all four bands, which in the example of FIG. 2, is 1570 nm. There may be applications that would benefit from a greater accuracy, for which a relatively increased modulation depth would be desirable for each of the four data channels. Such an example interrogation module having this increased accuracy is discussed in Example 2.

EXAMPLE 2

Figure 9:
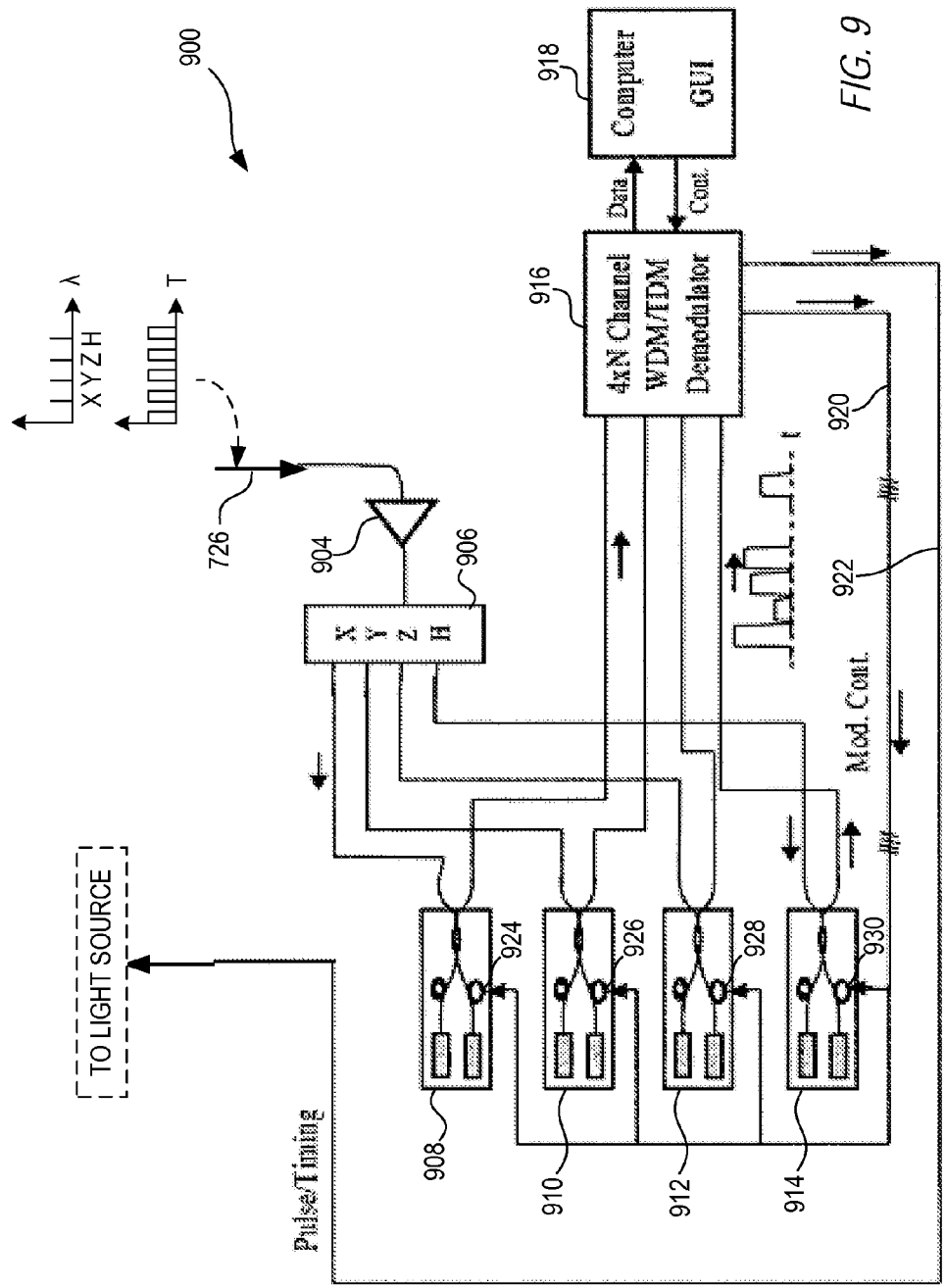
FIG. 9 shows a schematic drawing of another example of a topology for a WDM/TDM demodulator, as used in a sensing system.

FIG. 9 is a schematic drawing of a second example interrogation module 900, which includes a CWDM 906 to separate the four data channels from one another, followed by four Michelson interferometers 908, 910, 912, 914 that each converts a wavelength shift to a phase shift, followed by a 4-by-N channel WDM/TDM demodulator 820 that converts a phase shift to an intensity that is detectable on a detector, and also matches a sensed set of spectra with the proper sensor.

In this example interrogation module 900, the output fiber 726 delivers pulsed light to an amplifier 904. The amplified pulses from the optical amplifier 904 pass through a CWDM 906, which separates them into the four data channels X, Y, Z, H. Light in each of the four data channels is directed to its own Michelson interferometer 908, 910, 912, 914. Each Michelson includes first and second paths, as described above, with the second path in each including a PZT-base modulator 924, 926, 928, 930. These four modulators may all have their modulation depths optimized for the individual data channels, which was not possible with Example 1. Outputs from the four Michelson interferometers 908, 910, 912, 914 are directed along four separate fibers into a 4-by-N channel WDM/TDM demodulator 916, which communicates with a processing unit 918 (such as may, in some examples) form a part of a processing assembly), and drives the trigger signal 922 delivered to the light source and the modulation signals 920 delivered to the four PZT-based modulators 924, 926, 928, 930 in the four Michelson interferometers 908, 910, 912, 914.

Compared with Example 1, the example interrogation module 900 may be more accurate, because a modulation depth may be optimized for each of the four data channels, instead of a single modulation depth serving the four different data channels. In addition, the example interrogation module 900 may also be more expensive than Example 1, due to the three extra Michelson interferometers.

A further alternative configuration is discussed in Example 3, which generally allows for a higher bandwidth, reduced cost, and additional simplicity over Example 1, because the PZT-based modulator of Example 1 may be omitted.

EXAMPLE 3

Figure 10:
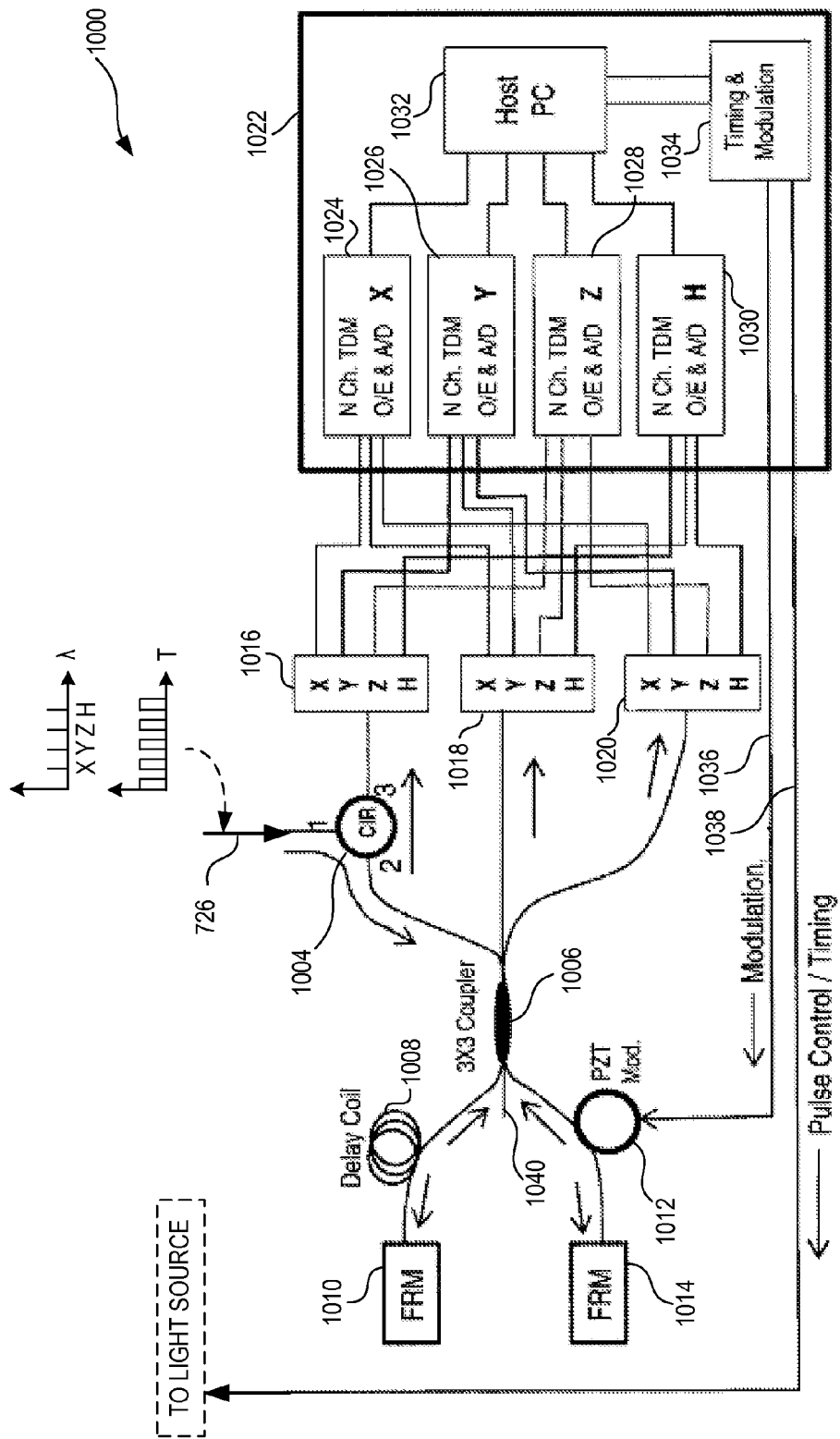
FIG. 10 shows a schematic drawing of another example of a topology for a WDM/TDM demodulator, as used in a sensing system.

FIG. 10 is a schematic drawing of a third example interrogation module 1000, which includes a 3-by-3 coupler 1006 that couples light into and out of a Michelson interferometer that converts a wavelength shift to a phase shift, the 3-by-3 having three outputs, each of which is directed into a respective CWDM 1016, 1018, 1020 that separates the four data channels from one another, followed by four 1-by-N channel WDM/TDM demodulators 1024, 1026, 1028, 1030 that convert a phase shift to an intensity that is detectable on a detector, and also match a sensed set of spectra with the proper sensor. Note that the four 1-by-N WDM/TDM demodulators are functionally equivalent to the single 4-by-N WDM/TDM demodulator discussed above.

In this example interrogation module 1000, the output fiber 726 delivers pulsed light to a first port of a circulator 1004. The pulses exit through a second port of the circulator 1004 and are directed toward one of three input ports in a 3-by-3 coupler 1006. The pulses are then split between two of the three output ports of the 3-by-3-coupler 1006, where the two output ports are configured similar to the two arms of a Michelson interferometer.

A first of the three output ports directs light to a fixed delay coil 1008 and terminates at a Faraday rotator mirror 1010. Light traveling from this first output port reflects at the Faraday rotator mirror 1010, and returns through the fixed delay coil 1008 to the 3-by-3 coupler 1006. A second of the three output ports directs light through an optional PZT-based modulator 1012 and terminates at a Faraday rotator mirror 1014. Light traveling from this second output port reflects at the Faraday rotator mirror 1014, and returns through the optional PZT-based modulator 1012 to the 3-by-3-coupler 1006. A portion of the pulses are also directed along a third port 1040 of the three output ports, but these pulses do not contribute to the signals in the device. This unused third port is omitted from the drawings of 3-by-3 couplers in upcoming FIG. 11, discussed below.

Light reflecting from the two FRM's in the Michelson interferometer interferes, but the configuration of the optical elements differs slightly from that of the Michelson interferometer discussed above. Whereas the Michelson interferometer of FIG. 8 uses a splitter/combiner (2×2 directional coupler) 808, the configuration of FIG. 10 instead uses a 3-by-3-coupler 1006. For this 3-by-3-coupler-based Michelson interferometer, the three outputs from the interferometer have a 120-degree phase difference from one another. In the absence of modulation to generate phase generated carrier (PGC) or precise control of the modulation depth, for example, demodulation of the optical phase difference between the two arms is possible with a relatively simple calculation using the three outputs. The PZT-based modulator 1012 is not used for phase demodulation, and is included in this example optionally as a way to optionally inject a reference signal, if desired.

The pulses returning to the two output ports of the 3-by-3 coupler 1006 interfere with each other, and are split among the three input ports. One of the three input ports directs the pulses to the second port of the circulator 1004. The pulses leave the third port of the circulator 1004 and enter a first CWDM 1016. Pulses from the second and third of the three input ports enter respective CWDMs 1018, 1020.

Each CWDM 1016, 1018, 1020 has four outputs, with each of the four outputs being directed to one of four N channel TDM demodulators 1024, 1026, 1028, 1030. The four demodulators 1024, 1026, 1028, 1030 correspond to the X, Y, Z, and H channels.

The outputs from the N channel TDM demodulators 1024, 1026, 1028, 1030 are directed to a processing assembly 1032, which is in communication with pulse control and timing modulator 1034. The pulse control and timing modulator 1034 directs a trigger signal 1038 to the light source and sends an (optional) periodic signal 1036 to the PZT-based modulator 1012. In some cases, the demodulators 1024, 1026, 1028, 1030, device processing unit 1032, and the timing modulator 1034 are all a portion of a processing assembly 1022, as discussed earlier herein.

The 3-by-3-coupler-based demodulation of Example 3 is not necessarily as accurate as the PGC-based demodulation scheme of Examples 1 and 2. However, Example 3 is generally simpler and is believed to be capable of a higher signal bandwidth than the PGC scheme. The system of Example 3 generally includes one Michelson interferometer with three CWDM's. Another configuration would be using one CWDM with four Michelson interferometers, such as described in detail below in Example 4.

Example 4 is not necessarily provided for performance enhancement versus Example 3, but Example 4 may provide convenience in terms of component availability or cost.

EXAMPLE 4

Figure 11:
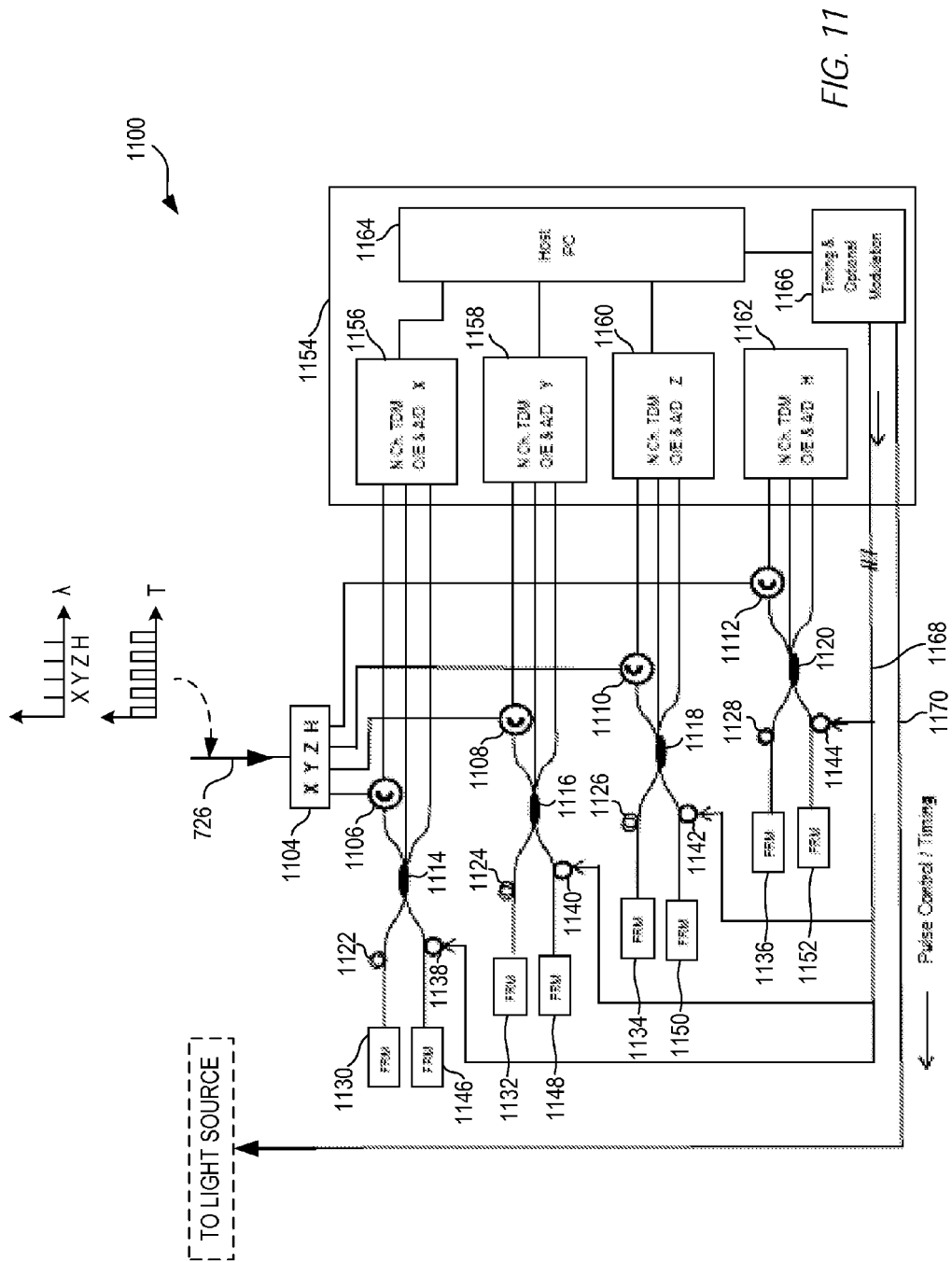
FIG. 11 shows a schematic drawing of another example of a topology for a WDM/TDM demodulator, as used in a sensing system.

FIG. 11 is a schematic drawing of a fourth example interrogation module 1100, which includes a CWDM 1104 to separate the four data channels from one another, followed by four interferometers coupled with respective 3-by-3 couplers 1114, 1116, 1118, 1120, followed by four 1-by-N channel WDM/TDM demodulators 1156, 1158, 1160, 1162 that converts a phase shift to an intensity that is detectable on a detector, and also matches a sensed set of spectra with the proper sensor. Note that only two of the three outputs are shown on the left-hand sides of the 3-by-3 couplers 1114, 1116, 1118, 1120; these third outputs are unused, similar to element 1040 in FIG. 10, and are therefore omitted from FIG. 11 for clarity.

In this example interrogation module 1100, the output fiber 726 delivers pulsed light to a CWDM 1104, which separates the light into the four data channels X, Y, Z, H. Light in each of the four data channels is directed through a respective circulator 1106, 1108, 1110, 1112 to a respective 3-by-3 coupler 1114, 1116, 1118, 1120. Each 3-by-3 coupler 1114, 1116, 1118, 1120 has a first output, which includes a fixed delay coil 1122, 1124, 1126 and a Faraday rotator mirror 1130, 1132, 1134, 1136 and has a second output, which includes a PZT-based modulators 1138, 1140, 1142, 1144 and a Faraday rotator mirror 1146, 1148, 1150, 1152. Light traversing the first output interferes with light traversing the second output, and the interfered light is directed into four 1-by-N demodulators 1156, 1158, 1160, 1162. The demodulators 1156, 1158, 1160, 1162 communicate with a processing unit 1164, which in turn communicates with a timing module 1166, which in turn drives the trigger signal 1170 delivered to the light source and the optional modulation signals 1168 delivered to the four PZT-based modulators 1138, 1140, 1142, 1144. In this example, the demodulators 1138, 1140, 1142, 1144, processing unit 1164, and timing module 1166 are all part of a processing assembly, as indicated generally at 1154. As discussed above, without being bound by theory, Examples 3 and 4 are believed to have relatively similar performance.

Example Methods of Operation

Given the light source and the sensing system discussed above and shown in FIGS. 1-11, it is worthwhile to describe use of the light source and the system in example methods that can produce pulsed light and can extract the retrieve the spectral information from each returned pulse.

Figure 12:
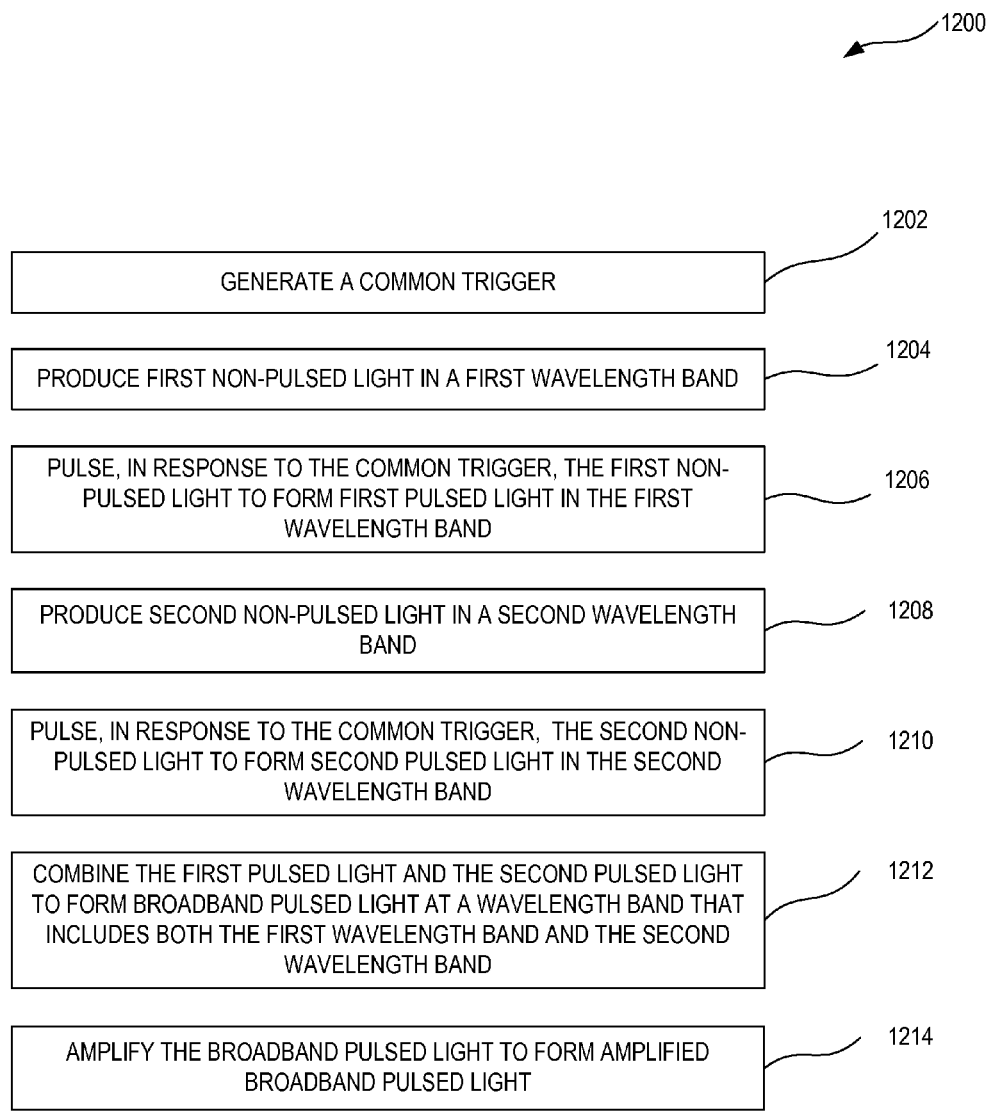
FIG. 12 shows a flow chart of a method of operation for the light source of FIG. 2.

FIG. 12 is a flow chart of an example method 1200 that can produce pulsed light. The example method 1200 begins at 1202 with generation of a common trigger for the light source. The common trigger will commonly, though not necessarily, be a periodic signal (such as 214, in FIG. 2). A suitable trigger may be the periodic trigger signal 704 provided from the interrogation module 704 to the light source 702 in FIG. 7.

Step 1204 produces first non-pulsed light, such as 206, in a first wavelength band. Step 1206 pulses, in response to the common trigger, the first non-pulsed light to form first pulsed light, such as 216, in the first wavelength band. Similarly, step 1208 produces second non-pulsed light, such as 208, in a second wavelength band. The second wavelength band is different from the first wavelength band. Step 1210 pulses, in response to the common trigger, the second non-pulsed light to form second pulsed light, 218, in the second wavelength band. In some examples, the pulsing in steps 1206 and 1210 is performed by separate amplifiers, such as amplifiers 206, 208 in FIG. 2, which are triggered from the same common trigger signal 214. The first pulsed light and the second pulsed light are, in many examples, pulsed synchronously, due to the common trigger.

Step 1212 combines the first pulsed light, such as 216, and the second pulsed light, such as 218, to form broadband pulsed light, such as 226, at a wavelength band that includes both the first wavelength band and the second wavelength band. The broadband pulsed light is also pulsed synchronously with the common trigger. Step 1214 amplifies the broadband pulsed light, such as 226, to form amplified broadband pulsed light, such as 230. The amplified broadband pulsed light also has a wavelength band that includes both the first wavelength band and the second wavelength band. The amplified broadband pulsed light is also pulsed synchronously with the common trigger.

Figure 13:
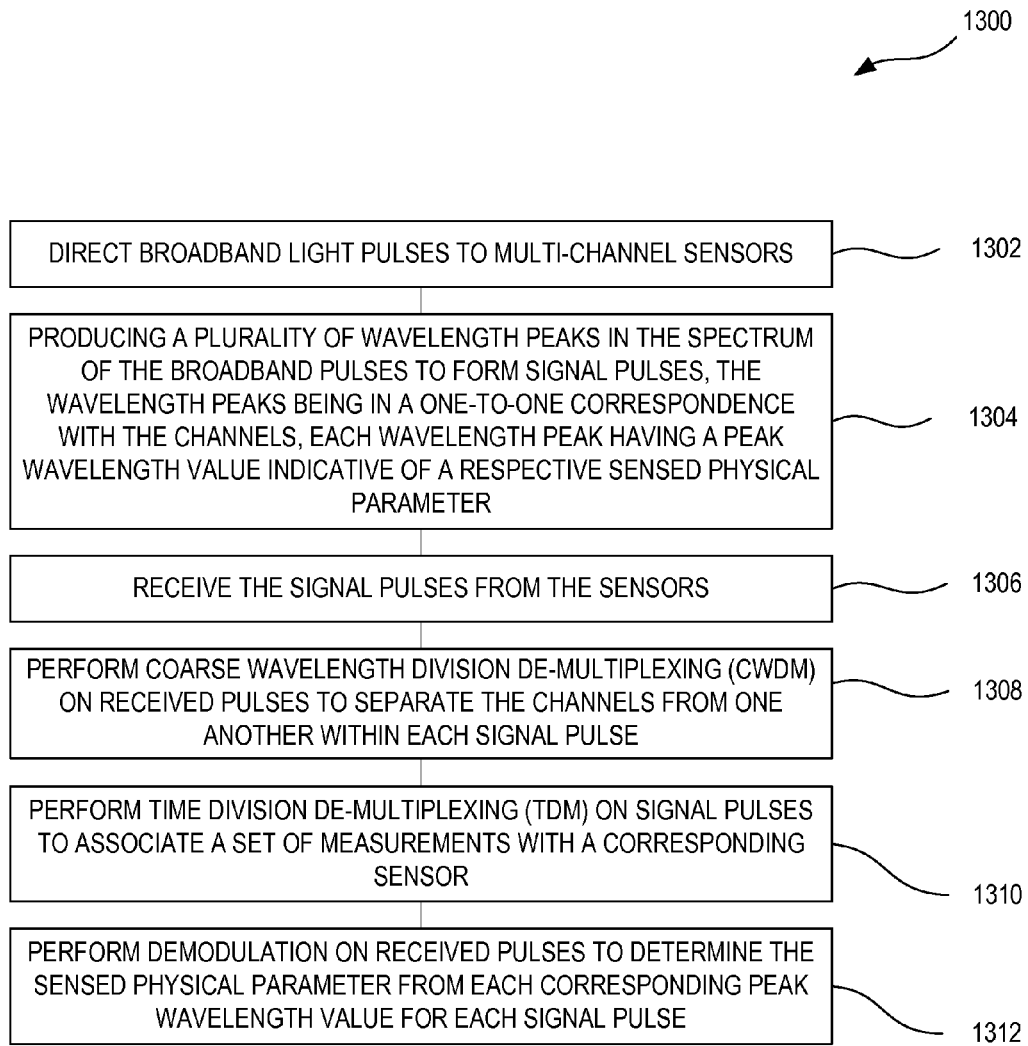
FIG. 13 shows a flow chart of a method of operation for the sensing system of FIG. 7.

FIG. 13 is a flow chart of an example method of operation 1300 for the sensing system described above. The method 1300 begins at 1302 by directing broadband pulses to a plurality of multi-channel sensors. In some examples, the sensors have four channels dedicated to particular physical parameters, such as accelerations in the X, Y, and Z directions, plus non-directional sensing of acoustic vibrations H. In other examples, the sensors have three channels dedicated to physical parameters, such as accelerations, in the X, Y, and Z directions, and the acoustic vibrations channel is omitted. In other examples, other physical parameters may be measured, such as velocities in the X, Y, and Z directions.

At step 1304 a plurality of wavelength peaks are produced in the spectrum of the broadband pulses by the sensors to form signal pulses. The wavelength peaks are in a one-to-one correspondence with the channels. Each wavelength peak has a peak wavelength value indicative of a respective sensed physical parameter. At step 1306 the signal pulses are received from the multi-channel sensors.

At step 1308 coarse wavelength-division de-multiplexing (CWDM) is performed on the received signals pulses to separate the channels from one another within each signal pulse. In one example, the four data channels have spectral bandwidths of 20 nm and are directly adjacent to one another. At step 1310 time-division de-multiplexing (TDM) is performed on the signal pulses to associate a set of measurements with a corresponding sensor. At step 1312 optical phase demodulation is performed to determine the sensed physical parameter from each corresponding peak wavelength value for each signal pulse either using a PGC demodulation scheme or a 3-by-3-coupler based demodulation scheme, for example.

Many modifications and variations may be made in the techniques and structures described and illustrated herein without departing from the spirit and scope of the present invention. Accordingly, it should be clearly understood that the scope of the inventive subject matter is defined only by the claims and their equivalents that are supported by this specification.

What is claimed is:

1. A distributed system for measuring physical parameters, comprising:
   a source of high-power broadband pulsed light having a generally flat output wavelength spectrum;
   at least one input optical fiber coupled to the source of broadband light;
   a plurality of sensors coupled to the input optical fiber at spaced locations along the fiber, at least some of the sensors each including a plurality of Fabry-Perot cavities for measuring a plurality of respective physical parameters at the location of the sensor, the plurality of Fabry-Perot cavities producing, within a plurality of respective data channels occupying a plurality of respective wavelength bands, output optical signals comprising respective narrow transmission bands whose peak wavelengths shift in response to the respective physical parameters;
   at least one output optical fiber coupled to the plurality of sensors and configured to receive and communicate the sensor output optical signals; and
   an interrogation module coupled to the at least one output optical fiber, the interrogation module being configured to separate the output optical signals from different ones of the sensors by time division demultiplexing and to separate the output optical signals from different ones of the Fabry-Perot cavities within each sensor by coarse wavelength demultiplexing and further configured to convert the output optical signals to electrical output signals.

2. The system of claim 1, wherein the interrogation module is a part of a processing assembly, and wherein the processing assembly is configured to further process the electrical output signals.

3. The system of claim 2, wherein the processing assembly comprises:
- at least one processor; and
- a machine-readable storage device including instructions that when executed by at least one processor, perform operations comprising,
  - receiving the electrical output signals from the interrogation module, and
  - further processing the signals to identify physical properties proximate the sensors.

4. The system of claim 1,
- wherein the source of broadband light is a pulsed source; and
- wherein the interrogation module is synchronized to the pulsed source.

5. The system of claim 4, wherein the broadband light extends at least partially across the telecommunications C-band and the telecommunications L-band.

6. The system of claim 1, wherein each of the Fabry-Perot cavities operates as an accelerometer.

7. The system of claim 1, wherein each Fabry-Perot cavity includes wavelength-sensitive filters that are partially reflective for a reflective channel of the plurality of channels, and are generally transmissive for all channels in the plurality other than the reflective channel; and
- wherein the reflective channels differ for each Fabry-Perot cavity in a sensor.

8. The system of claim 1, wherein the interrogation module comprises a 4×N channel multiplexer.

9. The system of claim 1, wherein the interrogation module is configured to convert the varying peak wavelength to a varying phase.

10. The system of claim 1,
- wherein the interrogation module comprises:
  - an interferometer configured to convert a wavelength shift to a phase shift, the interferometer having two optical paths that are divided and recombined by two arms of a 3-by-3 coupler; and
  - a coarse wavelength division de-multiplexer (CWDM) configured to separate the plurality of channels from one another; and
  - a demodulator configured to convert a phase shift to an intensity.

11. The system of claim 1, wherein the interrogation comprises:
- a plurality of interferometers corresponding to the plurality of channels, each interferometer configured to convert a wavelength shift to a phase shift and having two optical paths that are divided and recombined by two arms of a 3-by-3 coupler.

12. The system of claim 1, wherein the interrogation module comprises:
- an interferometer configured to convert a wavelength shift to a phase shift;
- a coarse wavelength division de-multiplexer (CWDM) configured to separate the plurality of channels from one another; and
- a demodulator configured to convert the phase shift to an intensity.

13. The system of claim 1, wherein the interrogation module comprises:
- a coarse wavelength division de-multiplexer (CWDM) configured to separate the plurality of channels from one another;
- a plurality of interferometers corresponding to the plurality of channels, each interferometer configured to convert a wavelength shift to a phase shift; and
- a demodulator configured to convert a phase shift to an intensity.

14. The system of claim 1, wherein the light source comprises:
- two light-producing elements producing non-pulsed light in the telecommunications band and C-band, respectively;
- two respective amplifiers triggered by a common trigger signal to generate synchronized pulsed light in the L-band and the C-band from the non-pulsed light of the two light-producing elements; and
- a beam combiner to generate the broadband pulsed light from the pulsed light in the L-band and the C-band.

15. A method for sensing a plurality of physical parameters, the method comprising:
- generating high-power broadband, pulsed light having a generally flat output wavelength spectrum:
- time-division multiplexing the pulsed light to a plurality of sensors at a plurality of spaced-apart locations;
- producing b Fabry-Perot cavities, within a plurality of wavelength bands, a plurality of respective output optical signals representing a respective plurality of physical parameters at each of at least some of the spaced-apart locations, the output optical signals comprising narrow transmission bands whose peak wavelength shifts, within the respective wavelength bands, in response to the respective physical parameters:
- time-division demultiplexing the output optical signals so as to associate the output optical signals with specific ones of the sensors, and separating the optical signals associated with different ones of the physical parameters by coarse wavelength-division demultiplexing;
- converting the output optical signals to electrical output signals; and
- transmitting the electrical output signals to a processing unit for analysis.

16. The method of claim 15, wherein the physical parameters comprise accelerations.

17. The method of claim 15 further comprising converting the peak wavelengths to phase shifts.

* * * * *